United States Patent [19]
Black, Jr. et al.

[11] Patent Number: 5,331,556
[45] Date of Patent: Jul. 19, 1994

[54] METHOD FOR NATURAL LANGUAGE DATA PROCESSING USING MORPHOLOGICAL AND PART-OF-SPEECH INFORMATION

[75] Inventors: James E. Black, Jr.; Uri Zernik, both of Schenectady, N.Y.

[73] Assignee: General Electric Company, Schenectady, N.Y.

[21] Appl. No.: 82,710

[22] Filed: Jun. 28, 1993

[51] Int. Cl.⁵ .............................. G06F 15/38
[52] U.S. Cl. ................................ 364/419.08
[58] Field of Search ............ 364/419.01, 419.02, 364/419.04, 419.05, 419.08, 419.13

[56] References Cited

U.S. PATENT DOCUMENTS

| | | | |
|---|---|---|---|
| 5,010,486 | 4/1991 | Suzuki et al. | 364/419.05 |
| 5,023,786 | 6/1991 | Kugimiya et al. | 364/419.04 |
| 5,077,668 | 12/1991 | Doi | 364/419.13 |
| 5,099,426 | 3/1992 | Carlgren et al. | 364/419 |
| 5,132,901 | 7/1992 | Yokogawa | 364/419.02 |
| 5,197,005 | 3/1993 | Shwartz et al. | 364/419 |
| 5,225,981 | 7/1993 | Yokogawa | 364/419.02 |
| 5,251,129 | 10/1993 | Jacobs et al. | 364/419.08 |

OTHER PUBLICATIONS

"The Art of Computer Programming, vol. 3, Sorting and Searching", pp., 481–499, Addison-Wesley, 1973.
"Computer Software for Working with Language", by Terry Winograd, Scientific American, vol. 251, Sep., 1984, pp. 131-145.

Primary Examiner—Donald McElheny, Jr.
Attorney, Agent, or Firm—Geoffrey H. Krauss

[57] ABSTRACT

An enhancement and retrieval method for natural language data using a computer is disclosed. The method includes executing linguistic analysis upon a text corpus file to derive morphological, part-of-speech information as well as lexical variants corresponding to respective corpus words. The derived linguistic information is then used to construct an enhanced text corpus file. A query text file is linguistically analyzed to construct a plurality of trigger token morphemes which are then used to construct a search mask stream which is correlated with the enhanced text corpus file. A match between the search mask stream and the enhanced corpus file allows a user to retrieve selected portions of the enhanced text corpus.

26 Claims, 3 Drawing Sheets

METHOD FOR NATURAL LANGUAGE DATA PROCESSING USING MORPHOLOGICAL AND PART-OF-SPEECH INFORMATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright fights whatsoever.

BACKGROUND OF THE INVENTION

The invention disclosed herein relates generally to natural language data processing and, more particularly, to a computer based method for enhancing natural language data for subsequent processing, and for retrieving natural language data from the enhanced natural language data using morphological and part-of-speech information.

Sophisticated techniques for archival of electrical signals representative of natural language data allow most business organizations and libraries to store vast mounts of information in their computer systems. However, regardless of how sophisticated the archival techniques become, the stored information is virtually worthless unless such information can be retrieved when requested by an individual user.

Typical techniques for retrieving a desired text use "keyword" and "contextual" searches. Each of these techniques requires the user to provide a fairly precise query or else retrieval of the desired text can be greatly compromised. As an example, a user may attempt to retrieve information on "heat seeking missiles", and request every textual fragment containing the word "seeking". Unfortunately, this technique would fail to retrieve fragments such as "successful missiles sought heat sources" or "smart missile seeks heat".

Alternatives have been suggested wherein a predetermined root of the keyword to be searched and a truncation mask are combined to increase the probability of matching various word endings or inflections. For example, if the exclamation point symbol "!" represents the truncation mask, then "seek!" would match "seeks" or "seeking" but still would fail to match "sought" and thus this approach does not fully resolve problems created by differences in word inflection.

A method for using morphological information to cross reference keywords used for information retrieval is disclosed in U.S. Pat. No. 5,099,426. The method described therein is primarily concerned with generating a compressed text and then searching for information in the compressed text using intermediate indexes and a compiled cross reference table. Although the method of the present invention also uses morphological information, the present invention has no requirements either for text compression or any such intermediate indexes and cross reference table. Further, the method described in the foregoing patent does not employ word sense disambiguation or part-of-speech (POS) information to refine the search. Accordingly, if the method described therein was utilized to search a text for "recording", it would likely find occurrences such as "record" "records", "recorded", "recording'- 'and possibly "prerecorded" and "rerecorded"; however, such method offers no provisions to refine the search to retrieve those occurrences only where "recording" is used as a noun, for example. Thus, it is desirable for the retrieval method to allow the user to specify word usage as part of the search strategy. In this manner, the user may request that occurrences of a predetermined word be retrieved only when the predetermined word is specifically used, for example, either as a verb, adjective, or noun.

It is therefore an object of the invention to provide an improved natural language data retrieval method which is not subject to the foregoing disadvantages of existing information retrieval methods.

It is a further object of the invention to provide a method for enhancement of natural language data such that the enhanced data may be conveniently used in a subsequent natural language processing scheme such as natural language data retrieval.

It is yet a further object of the invention to provide a natural language data retrieval method which uses morphological and part-of-speech information to increase the probability of retrieving selected textual information.

SUMMARY OF THE INVENTION

The foregoing and further objects of the invention will become apparent as the description proceeds. In accordance with the present invention an enhancement and retrieval method for natural language data using a computer is provided. The enhancement aspect of the method includes the steps of providing to the computer a text corpus file which comprises respective electrical signals representative of the natural language data. The electrical signals are processed to parse the text corpus file into a plurality of sentences each constituted of a respective stream of corpus words. Linguistic analysis, such as morphological, lexical, syntactic as well as semantic analysis, is executed upon each stream of corpus words to derive morphological roots, part-of-speech and lexical information corresponding to respective ones of the corpus words. The foregoing linguistic analysis allows for generation of an enhanced text corpus file, i.e., a linguistically enriched text corpus file which includes enhanced words tagged with a respective morphological root, part-of-speech information as well as lexical variants corresponding to respective ones of the corpus words. Each enhanced corpus word can further include a corresponding affix such as a prefix, or suffix, or both.

The retrieval aspect of the method includes the steps of providing to the computer a query text file which comprises respective electrical signals representative of predetermined inquiry data. The electrical signals representative of the predetermined query data are processed to parse the query text file into respective query items each constituted of a respective stream of query words. Morphological, semantic as well as domain specific synonym analysis is executed upon each stream of query words to generate a plurality of trigger token morphemes corresponding to respective ones of the query items. Part-of-speech information and collocation information associated with respective ones of the query words can be provided to further enhance each trigger token morpheme. A search mask stream based upon the plurality of trigger token morphemes is then generated. The enhanced text is scanned so as to correlate the search mask stream with the enhanced text corpus for retrieving a selected portion of the enhanced text based upon a match between the search mask stream and the enhanced text corpus.

BRIEF DESCRIPTION OF THE DRAWINGS

The features of the invention believed to be novel are set forth with particularity in the appended claims. The invention itself, however, both as to organization and method of operation, together with further advantages thereof, may best be understood by reference to the following description in conjunction with the accompanying drawings in which like numerals represent like steps throughout the drawings, and in which:

DETAILED DESCRIPTION OF THE INVENTION

Figure 1:
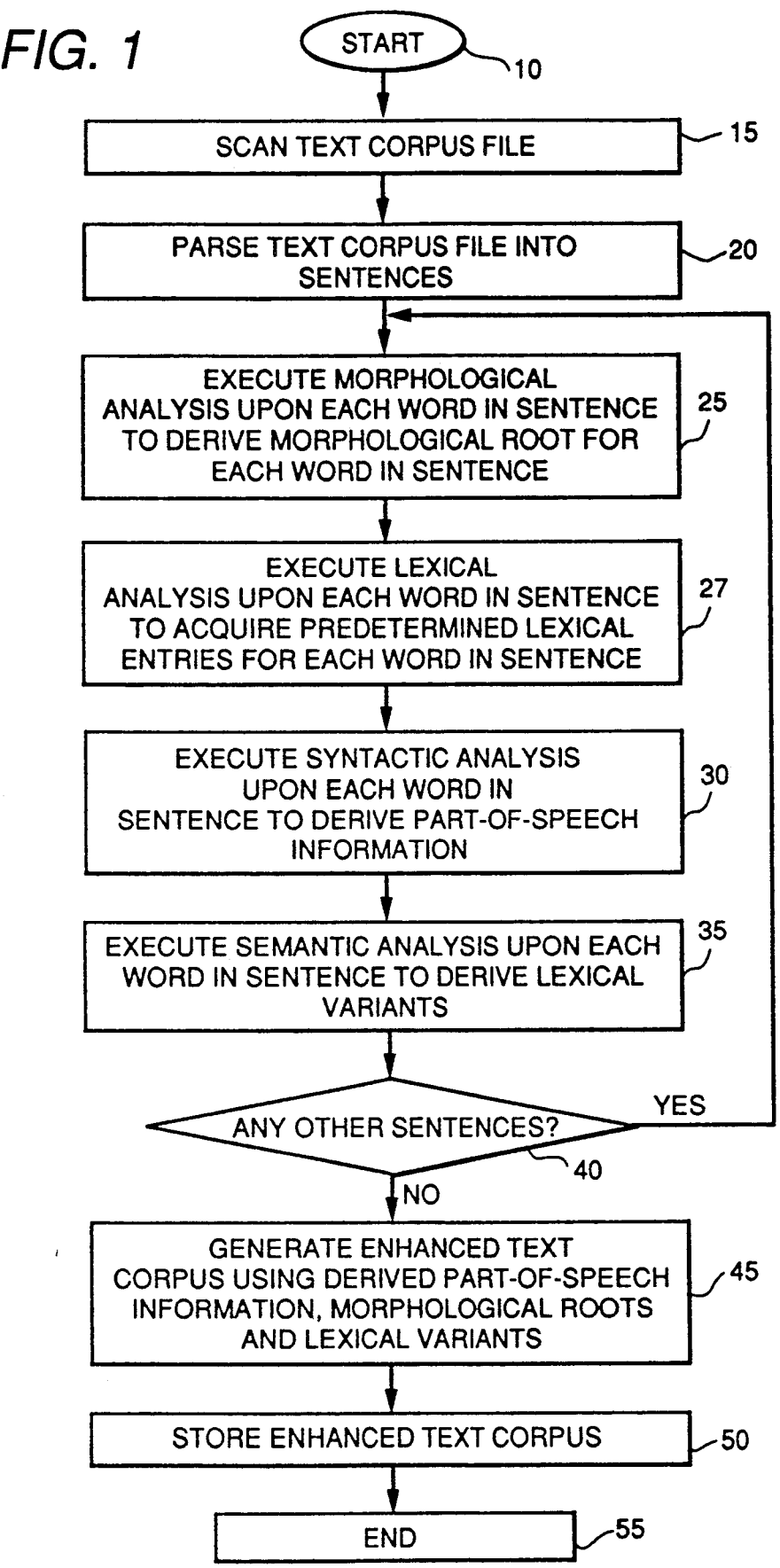
FIG. 1 is a flowchart illustrating a sequence of steps for constructing an enhanced text corpus file in accordance with the present invention.

FIG. 1 illustrates a sequence of method steps which can be advantageously implemented in a general purpose or special purpose computer. In either case, the computer can be part of a natural language data processing system which can be conveniently used to generate an enhanced text corpus in accordance with the present invention. Subsequent to start of operations, as indicated in step 10, a text corpus file made up of respective electrical signals representative of natural language data is provided to the computer in scanning step 15 from a bulk storage device such as a disk or tape device; or from a keyboard entry device; or from a communications link such as modem and the like. As used herein, natural language refers to a language, such as English, Spanish and the like, which human beings speak and write, as distinguished from artificial languages in which computer programs are written.

The electrical signals making-up the text corpus file which is provided to the computer are processed in step 20 by a processing module which operates in a manner well understood by those skilled in the art to parse the text corpus file into a plurality of individual sentences each constituted of a respective stream of corpus words, that is, the processing module is designed to extract individual sentences from the text corpus file.

Linguistic analysis is then performed by respective modules upon each stream of corpus words to derive respective part-of-speech information and morphological roots corresponding to respective ones of the corpus words. Specifically, morphological analysis is performed in step 25 by a morphological analyzer module upon each corpus word to derive a morphological root corresponding to a respective corpus word.

The morphological analysis may be performed by a method similar to that disclosed by Paul S. Jacobs et al in allowed U.S. patent application entitled "Method for Automated Morphological Analysis of Word Structure", Ser. No. 07/570,583, assigned to the assignee of the present invention and incorporated herein by reference. Briefly, a lexicon which can be stored in a memory unit such as a read-only-memory (ROM) or other suitable storage unit must be accessed to retrieve a lexical entry corresponding to a respective corpus word. The lexicon preferably contains a genetic list of electrically encoded lexical entries representative of natural language words. Additionally, the lexicon may contain a domain specific list of electrically encoded lexical entries representative of natural language words which are likely to be used in a predetermined manner in a specific application domain, for example, the lexicon may be adapted to the domain of government specifications, or medicine, or environmental legislation. In any case, for each lexical entry the lexicon can provide a morphological root, and applicable affixes such as prefixes or suffixes. Additionally, or alternatively, the lexicon can provide suitable rules for forming such affixes.

Further, the lexicon can be utilized to execute lexical analysis upon each word in a respective sentence, as indicated in step 27, to acquire predetermined lexical information such as word usage information, including but not limited to eligible part-of-speech usage information corresponding to a respective lexical entry. Thus, the lexicon, like an ordinary English language dictionary, can offer one or more lexical entries corresponding to a particular corpus word; however, unlike such ordinary dictionary the lexicon does not need to offer actual definitions. For example, in the case of the word "book", the task required to derive the morphological root is simply a look-up operation. However, in some other cases the root itself could be a derivative of some other word, and thus the morphological analysis in cooperation with the lexical analysis must be capable to recursively derive the entries for this root. For example, the word "acquisitions" has an immediate root "acquisition", which is in turn derived of the word "acquire". In either case, it should be appreciated that a morphological root may have multiple lexical entries representing different parts-of-speech. For example, the word "chip" may have one lexical entry as a noun and represent an integrated electronic circuit; or the word "chip" may have another lexical entry as a verb and represent the action of cutting a small piece of material.

Syntactic analysis is performed in step 30 by a syntactic analyzer module upon each corpus word to derive respective part-of-speech information and to resolve grammatical ambiguity associated with such part-of-speech information. By way of illustration, eligible part-of-speech information can be determined and resolved depending on the suffix of the corpus word being analyzed. For example, the suffix "s" can only transform a verb into the third person, singular, present tense form; or a noun into the plural form. Thus, the only eligible part-of-speech for a corpus word ending in the "s" suffix is either a noun or a verb. The syntactic analyzer "knows" this about the suffix "s", for example, and therefore will not access (or derive) lexical entries which are not nouns or verbs. For example, using this technique there would not be a need to consider the preposition lexical entry for the word "down" if the word under consideration is "downs". Another useful technique which can help to resolve part-of-speech ambiguity is local context analysis. For example, in the phrases "the preferred stock" and "he preferred coffee" the words "the" and "he" dictate that "preferred" is used in these phrases as adjective and verb respectively.

The syntactic analysis executed in step 30 is advantageously used to resolve part-of-speech ambiguity by identifying the subject, main verb, direct and indirect objects (if any), prepositional phrases, relative clauses, adverbial clauses, etc. for each sentence which constitutes the text corpus file. In particular, during this step of the linguistic analysis, groups of text corpus words, such as phrases, are defined and tagged in terms of an estimated grammatical function. For example, during this phrase-tagging step and depending on the particular context, a phrase can be tagged as a verb-phrase or a noun-phrase based on the estimated grammatical function assigned to this phrase.

In addition, recurring word relationships can be advantageously used to resolve part-of-speech ambiguity. By way of example, U.S. patent application of U. Zernik, entitled "A Method for Tagging Collocations in Text", Ser. No. 07/844,026, assigned to the assignee of the present invention and incorporated herein by reference, discloses a technique which can be conveniently used for performing part-of-speech tagging in the syntactic analysis step of the present invention. Briefly, the foregoing Zenik patent application discloses a technique which uses a calculated variability factor using statistics to measure the variability of a predetermined form that a particular construct takes in the text corpus file under analysis. For example, the construct "expressed concern" can behave as a verb-phrase in "she expressed concern about the issue" or as noun-phrase in "that issue is her expressed concern". Similarly, in "the preferred stock for long term investment" the construct "preferred stock" is a verb phrase, whereas the same construct is a noun-phrase in "GE preferred stock continued to perform well". Therefore, as illustrated in the foregoing exemplary cases, such constructs must be appropriately tagged in the enhanced text corpus to facilitate subsequent processing.

Semantic analysis is performed in step 35 upon each corpus word to allow the computer to better "understand" the meaning of each corpus word. Application domain specific information and semantic knowledge embodied in the lexicon can also be used to disambiguate phrases which exhibit a deep semantic ambiguity such as "get down from the elephant" versus "get down from the goose". Further, semantic analysis step 35 in cooperation with lexical analysis step 27 can be used to access lexical variations corresponding to a single corpus word so as to permit conceptual searches. In this manner "purchase/purchases/ purchasing/purchased" and "buy/buys/buying/bought" each can be traced to a common conceptual root such as "buy", even though the words "purchase" and "buy" do not trace linguistically to a common morphological root.

As indicated in step 40, the foregoing linguistic analysis is repeated until each sentence comprising the text corpus file is respectively analyzed as previously described, to generate an enhanced text corpus file in step 45 using the derived part-of-speech information, morphological roots and lexical variants. The enhanced text corpus file generated in step 45 is made up of a plurality of enhanced sentences each constituted of a respective stream of enhanced words. In particular, each corpus word in the text corpus file is replaced with an enhanced word which includes specific linguistic information pertaining to the corresponding corpus word. It will be appreciated by those skilled in the art that any of a number of representation techniques for the enhanced corpus words may be used and thus any such representation may be selected to facilitate a particular implementation. By way of illustration and not of limitation, an enhanced corpus word may be represented as follows:

<original corpus word/morphological root/prefixes/suffixes/part-of-speech/lexical variants>

For an abbreviated example in accordance with the foregoing representation, the enhanced word "seeking" may be represented as:

<seeking/seek//ing/x/find> where "seeking" is the original corpus word, "seek" is the morphological root, for simplicity of illustration the list of prefixes is empty while the list of suffixes is limited to the suffix "ing" only. The part-of-speech information represented by the letter "x" is not specifically listed in this example, since it is dependent upon the specific word usage in the sentence. For instance "seeking" could have been part of a verb phrase ("seeking new discoveries"), or, alternatively, part of a noun phrase acting as an adjective ("heat seeking missile"). "Find" is a possible lexical variant in the foregoing example. Once all the sentences in the text corpus file have been enhanced, the enhanced text corpus can be stored as indicated in step 50, in a bulk storage device or transmitted via a communications link to a remote storage device for subsequent use or processing. Step 55 indicates end of operations for constructing the enhanced text corpus which can be conveniently utilized in subsequent natural language information processing such as natural language retrieval or extraction of requirement data, or other line textual information extraction.

Figure 2:
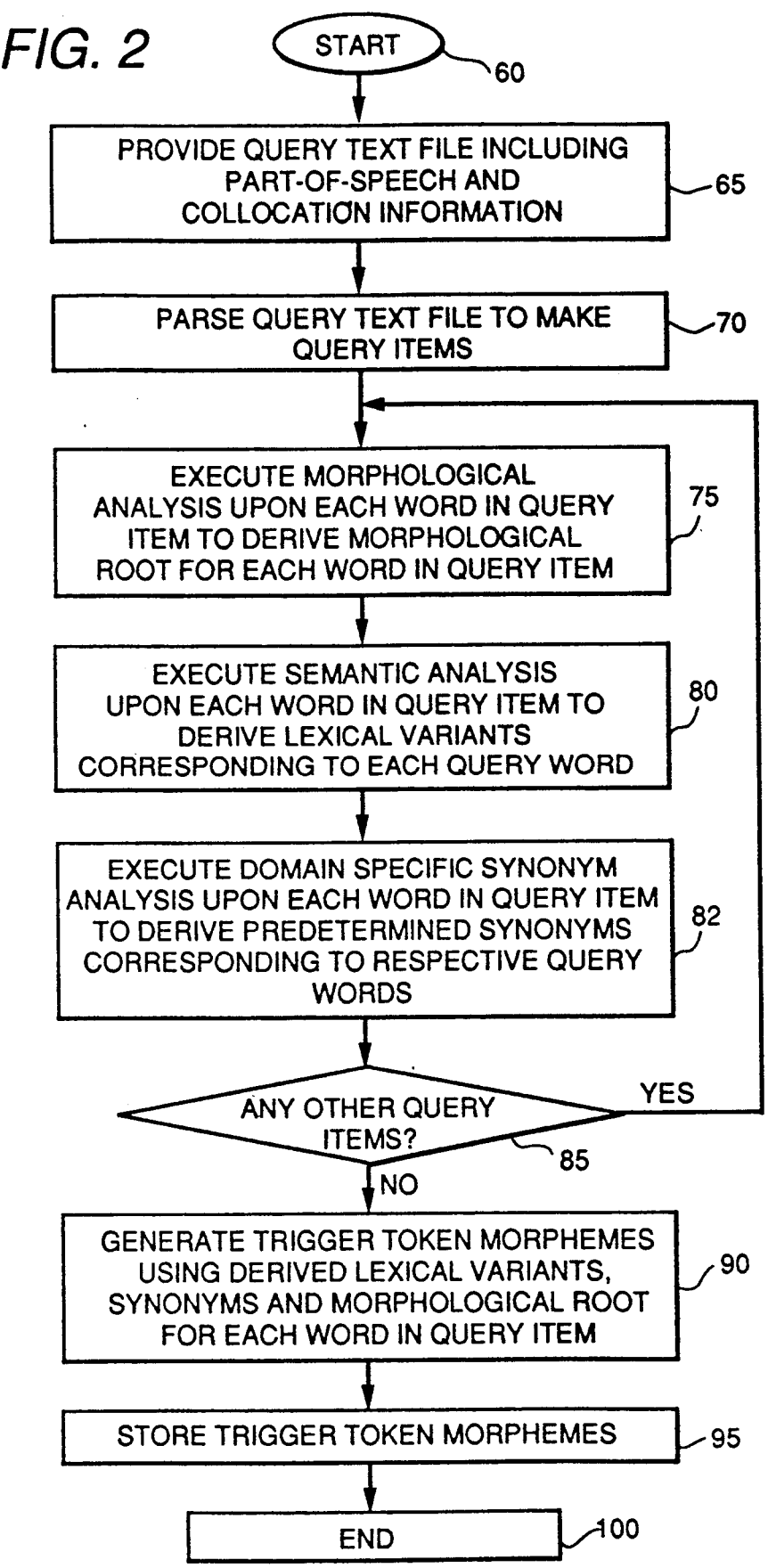
FIG. 2 is a flowchart illustrating a sequence of steps for constructing trigger token morphemes in accordance with the present invention.

FIG. 2 illustrates a sequence of method steps used to construct a plurality of trigger token morphemes in accordance with the present invention. As used herein, a trigger token morpheme refers to a linguistic unit representation which is constituted of one or more words and which uses at least morphological and part-of-speech information for the purpose of increasing the probability of triggering a match or "hit" during a textual search. Subsequent to start of operations, as indicated in step 60, a query text file made up of respective electrical signals representative of predetermined inquiry data is provided to the computer as indicated in step 65. The electrical signals making-up the query text file are processed as indicated in step 70 to parse the query text file into respective query items. Collocation as well as part-of-speech information can be conveniently provided as part of a query item to perform specific searches. For example, logical connector strings built in accordance with well understood techniques to those skilled in the art can be used to define a predetermined collocation of query words within a respective query item. A user may desire, for example, to retrieve information on boxing matches having terminated by knockout in the first round. Thus, a possible representation of a query item may be as follows:

<"first round/NN"(2W)knockout> wherein label NN represents noun part-of-speech information for the word "round", while (2W) indicates collocation information for query words therein, specifically (2W) can represent that the word "knockout" be collocated within 2 words of the construct "first round". A key feature of the trigger token morpheme representation is for the user to have the capability of providing part-of-speech information within a respective query item. This feature is particularly advantageous to narrow the search since as can be appreciated in the foregoing exemplary query item, the word "round" in addition to being a name could also be an adjective (the round table); a verb ( she rounded her lips); a preposition (Ali danced round the ring); and an adverb (the airplane circled round at sunset).

Morphological analysis is performed at step 75 upon each word in the query item to derive morphological roots for each word in query item. This morphological analysis is essentially identical to the morphological analysis described in the context of FIG. 1. Similarly, semantic analysis is performed at step 80 upon each word in query item to derive lexical variants corresponding to a query word. Domain specific synonym analysis can be further executed as indicated in step 82 upon each query word to derive predetermined synonyms likely to correspond to respective ones of the query words, and thus increase the probability of matching a desired textual search. For example, the word "gate" in the domain of electrical engineering may be associated with a switching circuit whereas the word "gate" in the domain of civil engineering may be associated with a barrier or wall. It should be appreciated by those skilled in the art, that the sequence of steps required to generate the trigger token morphemes can be performed independent of the enhanced text corpus and therefore such sequence of steps could be performed prior to generating the enhanced text corpus information. Further, assuming enough computational power was available, such steps could be perforated simultaneously, that is, the generation of the enhanced text corpus and the generation of the trigger token morphemes could be performed in a parallel mode of operation.

As indicated in step 85, the foregoing linguistic analysis is repeated until each query item comprising the query text file is respectively analyzed to generate a respective plurality of trigger token morphemes as indicated in step 90. The representation of the query words in a trigger token morpheme can be substantially similar to the exemplary representation of the enhanced words in the text corpus file described in the context of FIG. 1 with the proviso that, as is well understood by those skilled in the art, logical connectors and Boolean operators, like "and" or "or", can be used to indicate collocation of respective query words within a query item. As indicated in step 95, the plurality of trigger token morphemes can be stored in an appropriate bulk storage device prior to end of operations indicated in step 100.

The trigger token morphemes, alternatively, can be transmitted to a remote location via a communications link for subsequent use at such remote location.

Figure 3:
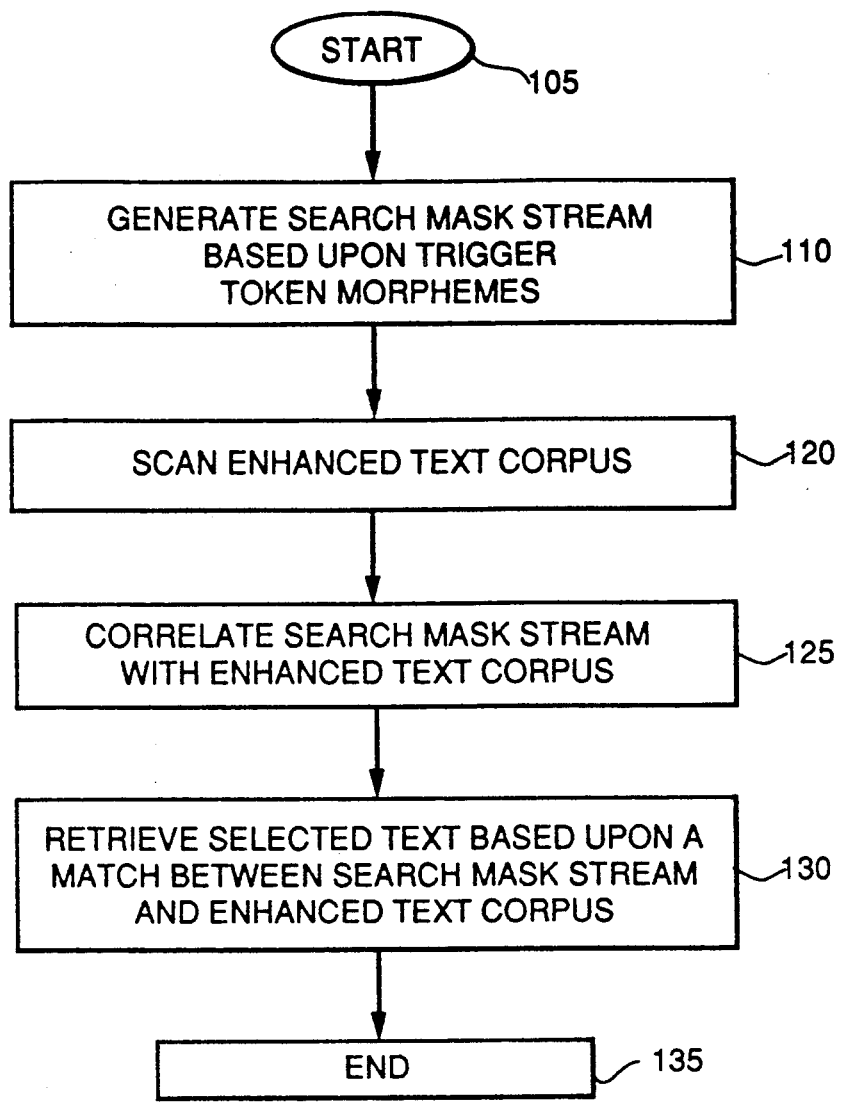
FIG. 3 is a flowchart illustrating a sequence of steps for retrieving a selected text using the trigger token morphemes upon the enhanced text corpus file.

FIG. 3 illustrates a sequence of steps which can be used to retrieve a selected text from the enhanced text corpus file. After start of operations in step 105, each trigger token morpheme is used to generate in step 110 a search mask stream based upon the plurality of such trigger token morphemes. The search mask stream is an appropriate internal representation which can be used in a conventional search engine module for pattern-matching selected portions of the enhanced text corpus file with the search mask stream. Typical digital search techniques applicable to English are disclosed, for example, by Donald E. Knuth in "The Art of Computer Programming, Vol. 3, Sorting and Searching", pp., 481–499, Addison-Wesley, 1973.

As indicated in step 120, a scanning device can be used to scan the enhanced text corpus to correlate in step 125 the search mask stream with the enhanced text corpus. In essence, the search mask stream and the enhanced text corpus are superposed, starting at the beginning of one another. If no match is detected, the search mask stream is shifted to the right (or to the left depending on the specific natural language under analysis) and the comparison is repeated. If no match is detected, a message such as "no match detected" can be provided to the user for suitable action. In operation, when there is a match between the search mask stream and the enhanced text corpus, a respective selected text is retrieved in step 130 and made available to the user. The retrieved selected text can be displayed or stored for subsequent use prior to end of operations indicated in step 135.

Appendix I contains computer source code listings which may be utilized to control operation of a computer in accordance with the present natural language data processing method. The code as written may be executed by a Sun Workstation, for example.

While only certain features of the invention have been illustrated and described herein, many modifications and changes will occur to those skilled in the art. It is therefore, to be understood that the appended claims are intended to cover all such modifications and changes as fall within the spirit of the invention.

Appendix I

Source Code Listings

Imrun.txt

```
#! /bin/csh -f

syntax is IMrun <filename> <Root Document ID> unset noclobber
set source = $argv[1]
set DocID  = $argv[2]

#../cleaning/put_period <$source | ../cleaning/capitals | \
#  ../cleaning/period | ../cleaning/style >/tmp/cleaned.$USER

../source/kms2sen $DocID < $source > /tmp/sent.$USER
```

```
../morphology/processor -q < /tmp/sent.$USER > /tmp/morphed.$USER

../morphology/diff_filter < /tmp/morphed.$USER \
  | ../tagging/tag20      \
  | ../tagging/tag21      \
  | ../tagging/tag00      \
  | ../tagging/tag10      \
  | ../tagging/tag4       \
  | ../tagging/tag11      \
  | ../tagging/tag12      \
  | ../tagging/tag2       \
  | ../tagging/bra23      \
  | ../tagging/bra22      \
  | ../tagging/bra24      \
  | ../tagging/bra2       \
  | ../tagging/tag3       \
  | ../tagging/bra4       \
  | ../tagging/bra25      \
  | ../tagging/tag31      \
  | ../cleaning/rmbrackets \
  | ../tagging/bra23      \
  | ../tagging/bra22      \
  | ../tagging/bra24      \
  | ../tagging/bra2       \
  | ../tagging/bra4       \
  | ../tagging/tag45      \
  | ../cleaning/phrase_tagger \
  | ../cleaning/rmbraces   \
  | ../cleaning/fix_brackets > /tmp/tagged.$USER finally, we want a file containing the roots for trigger token check, so
../utilities/field 2 < /tmp/tagged.$USER > /tmp/roots.$USER
``` kms2sen.lex

```
%{

/* Will (hopefully) read a KMS frame, taking the text and breaking it into
   sentences, writing out one sentence per line */

/* Will condense whitespace down to a single blank wherever possible */

/* *NOTE*

This program counts on the source frameset never being altered from the
   current format... regarding the table of contents entries on frames
within
   the document.  These TOC frames should contain data as part of each
   selection and the data MUST appear as the first thing after the +S+ #
line.
   Additionally, this program counts on these TOC selections as being the
   last things within the frame.

*/ include <stdio.h>
include <string.h>
include <ctype.h> int sel_count = 0, numofsentences = 0, endofparagraph = 0;
int waiting_for_text = 0, firstnum = 0;
char datastr[50], paratag[50];
int i = 0, j = 0;

FILE *fp;

%}

ABBREV   (i\.e\.|i\.\ e\.|e\.g\.|e\.\ g\.|et\.\ al\.|vs\.|Mr\.|Mrs\.|
          Ms\.|Dr\.|Sen\.|Rep\.|Jr\.|jr\.|Sr\.|sr\.|U\.S\.|U\.\ S\.|
```

```
                G\.E\.|G\.\ E\.|gov\.|mil\.|std\.|corp\.|Corp\.|co\.|Co\.|
                inc\.|Inc\.|ltd\.|rev\.|Rev\.|no\.|No\.|hz\.|Hz\.|khz\.|kHz\.|
                ml\.|ref\.|Ref\.|fig\.|Fig\.|cat\.|Cat\.|in\.|ft\.|yd\.|mi\.|
                sec\.|in\.|abs\.|Para\.|para\.)

COMMA       \,
CR          "\n"
INT         [0-9]+
WS          [ \t\n]*
ONEWS       [ \t\n]+
BLANK       [ \t]*
NUMBER      {INT}(\.{INT})*\.?
NONTEXT     "+"[^TSZ \t\n]+" "
PUNCT       [\(\)\,\{\}]

%START   text restoftitle title
%%
<text>{ONEWS}{NUMBER}      { ECHO;
                    endofparagraph = 1;
                    /*i = 0;
                    while (yytext[i] != '\0') {
                      if (yytext[i] == '\n')
                        numofsentences++;
                      i++;
                    }
                    firstnum = 1; */ }
<text>{ONEWS}{NUMBER}/\ \        { ECHO; printf("\n");
                    endofparagraph = 0;
                    numofsentences++;
                    firstnum = 1; }
{WS}              { printf(" "); }

^"+D+ ".*\n            { if (strcmp(yytext, "+D+ TOC\n") == 0)
                       return(0);
                     if (strncmp(yytext, datastr, strlen(datastr)) == 0) {
                       i = strlen(datastr);
                       j = 0;
                       while (yytext[i] != '\0' && yytext[i] != '\n') {
                         paratag[j] = yytext[i];
                         j++;   i++;
                       }
                       paratag[j] = '\0';

}
                   }
^{NONTEXT}.*\n         { /* ignore all lines that are not text */ }
^"+T+ @".*\n           { /* ignore text which is irrelevent */ }
^"+T+ <"\n             { /* ignore change indicators */ }
^"+T+ >"\n             { /* ignore change indicators */ }
^"+T+ mv"\n            { /* ignore change indicators */ }
^\+T\+\ $              { printf("\n"); numofsentences++;}
^"+S+ ".*\n            { waiting_for_text = 1;
                     if (endofparagraph != 0)
                       numofsentences++;
                     if (paratag[0] != '\0')
                       (void) fprintf(fp, "%s %d\n", paratag,
                           numofsentences);
                     paratag[0] = '\0';
                     endofparagraph = 0;
                     numofsentences = 0; }
^"+T+ "                { BEGIN text;
                     sel_count++;
                     waiting_for_text = 0;
                     /* ignore KMS notation on text lines */
                   }
^"+T+ "{NUMBER}        { if (firstnum == 0) {
                     firstnum = 1;
                     BEGIN title;
                   }
                   else
                     firstnum = 1;
                   printf("%s", &yytext[4]);
                 }
```

```
<text>{ABBREV}            ( ECHO;
                         firstnum = 1; }
<text>[a-zA-Z]\.{WS}/[^A-Z]     ( ECHO; /*single letters may be list
things*/
                         i = 0;
                         while (yytext[i] != '\0') {
                           if (yytext[i] == '\n')
                             numofsentences++;
                           i++;
                         }
                         endofparagraph = 0;
                         firstnum = 1; }
<text>{PUNCT}              ( ECHO;
                         firstnum = 1; }
<text>"etc\."{PUNCT}     ( ECHO; )
<text>"etc\."{WS}/[A-Z] ( printf("etc.\n");
                         endofparagraph = 0;
                         numofsentences++; /* special case:allow etc.
                                              to end sentence when
                                         followed by a capital
                                         letter. */ )
<text>[^ \"\t\n\.\?\!\;\:\(\)\,\[\]]+    ( ECHO; )

<text>\./[^ \"\t\n]       ( ECHO; )
<text>\.                  ( printf(".\n");
                         endofparagraph = 0;
                         numofsentences++; }

<text>(:{BLANK}|:\"{BLANK})/\n   ( printf(":\n");
                         endofparagraph = 0;
                         numofsentences++; )
<text>:           ( printf(":"); )

<text>(\?|\!|\;)          ( ECHO; printf("\n");
                         endofparagraph = 0;
                         numofsentences++; )
<text>(\.\"|\!\"|\?\"|\;\"){WS} ( ECHO; printf("\n");
                         endofparagraph = 0;
                         numofsentences++;
                        }

<title>[^.\n]*\.          ( ECHO;
                         printf("\n");
                         endofparagraph = 0;
                         numofsentences++;
                         BEGIN text;
                        }
<title>[^.\n]*\n          ( ECHO;
                         endofparagraph = 0;
                         numofsentences++;
                         BEGIN 0;
                        }
^"+2+ "\n                 ( if (paratag[0] != '\0' && numofsentences != 0)
                           (void) fprintf(fp, "%s %d\n", paratag,
                                     numofsentences);
                         paratag[0] = '\0';
                         endofparagraph = 0;
                         numofsentences = 0;
                        }
``` main_processor.c

```
/*****************************************************************/
/*                                                               */
/*name      - prog.c                                             */
/*purpose   - this program will take as input ascii text, and return a */
/*            morphologized version of the text.                 */
/*                                                               */
/*this program takes each word in the stream and preforms the following */
/*tasks.                                                         */
```

```
/*                                                                          */
/*1) if the word exists in the *** list, then it can not be broken down and */
/*    it is simply echoed back as a tuple with no root entry                */
/*    ie, the word HERE becomes HERE///49                                   */
/*                                                                          */
/*    here is an example of the *** list.                                   */
/*                                                                          */
/*                                                                          */
/*2) the word is now reversed (ie FORCING becomes GNICROF). then a recursive*/
/*    procedure is applied which will identify and isolate suffixes from the*/
/*    word. the candidate suffix is stripped off and the resulting word     */
/*    fragment is compared against the word list, and a word fragment list. */
/*    if the word fragment is on the word list then the suffix has been     */
/*    identified correctly. FORCING - ING is identified from endings_table  */
/*    and FORC is a word on the fragment list. so FORCING becomes           */
/*    FORCING/FORCE/ING/19. the same procedure is used for prefixes, using  */
/*    the prefix table prefix_table.                                        */
/*                                                                          */
/*    here is an example of endings_table which is the suffix list.         */
/*    "GNI GNI",                                                            */
/*    "GA EGA",                                                             */
/*    "EZI EZI",                                                            */
/*    column 1 is the logical suffix (the name of the suffix)               */
/*    column 2 is the actual suffix                                         */
/*                                                                          */
/*    here is an example of the fragment table Rtable                       */
/*    "CROF ECROF 26",                                                      */
/*    "CROFED ECROFED 19",                                                  */
/*    "CROFFE TROFFE 05",                                                   */
/*    "CROFLLIH TROFLLIH 05",                                               */
/*    column 1 is the chopped off word                                      */
/*    column 2 is the original word                                         */
/*    column 3 is the part of speech                                        */
/*                                                                          */
/*    here is an example of the ntable                                      */
/*    "GNI 91 00",                                                          */
/*    "GNI 50 00",                                                          */
/*    "EZI 91 00",                                                          */
/*    "EVI 70 00",                                                          */
/*    column 1 is the logical suffix                                        */
/*    column 2 is the resulting part of speech                              */
/*    column 3 is the initial part of speech                                */
/*                                                                          */
/*    here is an example of the prefix table btable                         */
/*    "PRO",                                                                */
/*    "PRE",                                                                */
/*    "OVER",                                                               */
/*    "OUT",                                                                */
/*    column 1 is the prefix                                                */
/*                                                                          */
/****************************************************************************/ include <stdio.h>       /* for printf(), fprintf() */
include <errno.h>       /* for perror() */
#include <ctype.h>       /* for isspace() */
#include <search.h>      /* for bsearch() */
#include <string.h>
#include "alloc.h"       /* for MALLOC() */
#include "morph.h"       /* for constants */

/*for help */
static char Usage[] =
"Usage is %s [-h] [-m] [-t morphology_type] [-d] [-r] [-i] [-r]\n\
        [-n] [-F directory] [-w exlusive_suffix] [-q] [-e] [-z] \n\
\n\
Provide on the standard output signatures of documents entered in SGML\n\
format on the standard input.\n\
\n\
```

```
Where:\n\
        -n      no canned words\n\
\n\
        -e      relative to an exclude_pos list\n\
\n\
        -i      relative to an include_pos list\n\
\n\
        -r      print out roots only\n\
\n\.
        -m      name bracketing\n\
\n\
        -z      no text output\n\
\n\
        -t      either \n\
                'f' (inflectional) \n\
                'p' (plural_strip) \n\
                'd' (derivational) \n\
\n\
        -d      debugging on\n\
\n\
        -p      repeat on\n\
\n\
        -q      silently\n\
\n\
        -F      Set the directory where tables can\n\
                be read. ../lexicon is the default.\n\
\n\
        -w      set exlusive suffix (for lexical generation)\n\
\n\
        -c      print out also collocations (inflectional)\n\
\n\
        -h      Print this message to the standard error stream.\n\
";

/*Used to communicate with getopt */
extern char     *optarg;
extern int      optind, opterr;

/*reference to original word (yytext) */
extern char *original_word;
extern char *prefixed_word;

/*store previous word (for limited tagging) */
extern char previous_word[];
extern char previous_root[];

/*retain path to lexicon */
extern char path[];

/*various modes */
extern int debug;
extern int repeat;
extern int inflectional_canned_words;
extern int lsuffix;
extern int no_canned_words;
extern int inflectional_morph;
extern int include_list;
extern int exclude_list;
extern int roots_only;
extern int plural_strip;
extern int silently;
extern int no_text_output;
extern int statistics;
extern int capitalized_output;
extern int do_prefix;
extern int collocations;
extern int name_bracketing;

/*in case of lexicon preparation*/
extern char exclusive_suffix[];
```

```c
/*external libraries */
extern char *yytext;
extern int yylex();
extern char **bsearch();
extern char *strrchr();

/****************************************************************/
/*Procedure: usage_error                                        */
/*Purpose: this will reverse the input string                   */
/*                                                              */
/*                                                              */
/****************************************************************/ void usage_error(name, message)
     char *name;
     char *message;
{
  fprintf(stderr, Usage, name);
  if (message)
    fprintf(stderr, "\n%s\n", message);
  exit(-1);
}  /* End of usage_error */

/****************************************************************/
/*Procedure: main                                               */
/*Purpose:                                                      */
/*                                                              */
/*                                                              */
/****************************************************************/ main(argc, argv)
     int argc;
     char *argv[];
{
  int          optletter;

while ((optletter = getopt(argc, argv, "qriehmt:dnF:w:spcakz")) != -1)
    {
      char    *endnum;

switch (optletter)
        {
        case 'z':
          no_text_output = 1;
          break;

case 'i':
          include_list = 1;
          break;

case 'k':
          capitalized_output = 1;
          break;

case 'a':
          do_prefix = 1;
          break;

case 's':
          statistics = 1;
          break;

case 'e':
          exclude_list = 1;
          break;

case 'c':
          collocations = 1;
          break;
```

```
      case 'r':
        roots_only = 1;
        break;

case 'q':
        silently = 1;
        break;

case 'h':
      default:
        usage_error(argv[0], NULL);
        break;

case 'n':
        no_canned_words = 1;
        break;

case 'm':
        name_bracketing = 1;
        break;

case 'w':
        strcpy(exclusive_suffix,optarg);
        break;

case 't':
        if (optarg[0] == 'f')
          {
            inflectional_morph = 1;
            fprintf(stderr,"*** Starting inflectional morphology ***\n");
          }
        else if (optarg[0] == 'p')
          {
            plural_strip = 1;
            fprintf(stderr,"*** Starting plural stripping ***\n");
          }
        else if (optarg[0] == 'd')
          {
            fprintf(stderr,"*** Starting derivational morphology ***\n");
          }
        else
          {
            usage_error(argv[0], NULL);
          }
        break;

case 'd':
        debug = 1;
        break;

case 'p':
        repeat = 1;
        break;

case 'F':
        if (chdir(optarg))
          {
            perror(argv[0]);
            exit(-1);
          }
        break;
    }
}

/* initialize environemt variable */
sprintf(path,"%s/imtoolset/sun4_4.noload/src",getenv("SIRREX"));

/* initialize tables */
init_all_tables();
```

```
/* read the input token and do lexical analysis*/
yylex();

}
``` morphl.lex

```
%{
/* This program tokenizes special characters (anything not alphanumeric) */
/* In particular, notice the following problems:                         */
/* 1.    We need to distinguish a period from a dot                      */
/* 2.    We need to distinguish angular brackets from SGML tags          */
/* 3.    We should not touch text in fields that are not TXT, HL, S or P */
/* 4.    We need to identify appostrophe S (e.g., boy's)                 */
/* 5.    Stylistic abbreviations (e.g., hadn't, he'd) are not addressed  */

/* This program is linked with period.c which provides a table lookup    */
extern void morphologize();
extern void morphologize2();
extern int found();
extern char *lookup_abbrevs_table();
%}
to          to
day         (sunday|monday|tuesday|wednesday|thursday|friday|saturday)
month       (january|february|march|april|june|july|august|september|
             october|november|december)
abbr-month  (jan|feb|mar|apr|jun|jul|aug|sept|sep|oct|nov|dec)[\.]?
year        19[0-9][0-9]
number      [0-9]+
snumber     [0-9]+(th|rd|st|nd)
Rnumber     [0-9]+[0-9\,\.\/\-]+[0-9]+
word        [a-z0-9\&]+
field_word  [a-z0-9\-\_]+
descriptor  (HL|TXT|S|P)
dot         "."
ex-mark     "!"
q-mark      "?"
dollar      "$"
pound       "#"
and         "&"
s-colon     ";"
colon       ":"
dash        "-"
under       "_"
not         "~"
comma       ","
backslash   "\\"
d2-quote    "''"
d1-quote    "``"
d-quote     \"
l-paren     "("
bar         "|"
equ         "="
plus        "+"
star        "*"
carret      "^"
r-quote     "`"
l-quote     "'"
r-paren     ")"
slash       "/"
pc          "%"
tab         "@"
l-curly     "{"
r-curly     "}"
rangbra     ">"
langbra     "<"
r-bra       "]"
l-bra       "["
letter      [A-Z]
dots        [\.]{3}
white       [\ \t\n]+
line        ("---"("-")+)|("___"("_")+)|("***"("*")+)|("==="("=")+)
```

```
%START field ap
abbrev   [0-9A-Za-z\.\-\_]+
%%
"<"{descriptor}">"                    {BEGIN 0 ; ECHO;}
"<"{field_word}">"                    {BEGIN field; ECHO;}
"</"{field_word}">"                   {BEGIN 0 ; ECHO;}
<field>[^<^\n]+                       {ECHO;}
<field>\n                             {ECHO;}
<field>{langbra}                      {ECHO;}
{white}                               {printf("%s",yytext);}
\*(CAPF|CAPW|CAPL|CAPA)\*             {ECHO;}
({letter}{dot})+                      {BEGIN 0;morphologize(yytext,8);}
{year}                                {morphologize(yytext,6);}
{number}                              {morphologize(yytext,3);}
{snumber}                             {morphologize(yytext,11);}
{Rnumber}                             {morphologize(yytext,4);}
{day}                                 {morphologize(yytext,7);}
{to}                                  {morphologize(yytext,9);}
{month}|{abbr-month}                  {morphologize(yytext,5);}
{word}{dot}                           {BEGIN 0;
                                       if (lookup_abbrevs_table(yytext) != NULL)
                                              morphologize(yytext,8);
                                       else
                                              REJECT;
                                      }
{backslash}        {morphologize("*backslash*",1);}
{comma}            {morphologize("*comma*",1);}
{dash}             {morphologize("*dash*",1);}
{under}            {morphologize("*underscore*",1);}
{dash}{dash}       {morphologize("*dashes*",1);}
{not}              {morphologize("*squiggle*",1);}
{dots}             {morphologize("*dots*",1);}
{d-quote}          {morphologize("*d-quote*",1);}
{d1-quote}         {morphologize("*d1-quote*",1);}
{d2-quote}         {morphologize("*d2-quote*",1);}
{dollar}           {morphologize("*dollar*",1);}
{pound}            {morphologize("*pound*",1);}
{and}              {morphologize("*and*",1);}
{dot}              {morphologize("*period*",1);}
{q-mark}           {morphologize("*q-mark*",1);}
{s-colon}          {morphologize("*s-colon*",1);}
{colon}            {morphologize("*colon*",1);}
{r-paren}          {morphologize("*r-paren*",1);}
{l-paren}          {morphologize("*l-paren*",1);}
{r-bra}            {morphologize("*r-bra*",1);}
{l-bra}            {morphologize("*l-bra*",1);}
{bar}              {morphologize("*bar*",1);}
{equ}              {morphologize("*equ*",1);}
{star}             {morphologize("*star*",1);}
{plus}             {morphologize("*plus*",1);}
{carret}           {morphologize("*carret*",1);}
{r-quote}          {morphologize("*r-quote*",1);}
{l-curly}          {morphologize("*l-curly*",1);}
{r-curly}          {morphologize("*r-curly*",1);}
{slash}            {morphologize("*slash*",1);}
{ex-mark}          {morphologize("*ex-mark*",1);}
{tab}              {morphologize("*tab*",1);}
{pc}               {morphologize("*pc*",1);}
{word}[\-\/]{word} {  yytext[strlen(yytext)-1] = '\0';
                      morphologize(yytext,2);
                      morphologize("*hyphen*",10); }
[0-9]?[\,][0-9]    {morphologize(yytext,1);   }
[0-9]([\.][0-9])+  {morphologize(yytext,1);   }
{rangbra}          {morphologize("*r-angular*",1);}
{langbra}          {morphologize("*l-angular*",1);}

"\'"               {morphologize("*l-quote*",1);}
"\'S"              {morphologize("*ap-s*",1);}
"\'Z"              {morphologize("*ap-s*",1);}
```

```
{word}(S|Z)\'         {yytext[strlen(yytext)-1] = '\0';
                       morphologize(yytext,2);
                       morphologize("*ap*",1);}
{word}\'D             {yytext[strlen(yytext)-2] = '\0';
                       morphologize2(yytext,"would");}
{word}\'LL            {yytext[strlen(yytext)-3] = '\0';
                       morphologize2(yytext,"will");}
WON\'T                {morphologize2("would","not");}
CAN\'T                {morphologize2("can","not");}
COULDN\'T             {morphologize2("could","not");}
{word}N\'T            {yytext[strlen(yytext)-3] = '\0';
                       morphologize2(yytext,"not");}
CANNOT                {morphologize2("can","not");}
WE\'RE                {morphologize2("we","are");}
WE\'VE                {morphologize2("we","have");}
I\'VE                 {morphologize2("I","have");}
I\'M                  {morphologize2("I","am");}
HE\'S                 {morphologize2("he","has");}
SHE\'S                {morphologize2("she","has");}
YOU\'VE               {morphologize2("YOU","HAVE");}
THEY\'VE              {morphologize2("they","have");}
THEY\'RE              {morphologize2("they","are");}
YOU\'RE               {morphologize2("you","are");}
THERE\'S              {morphologize2("there","is");}
HERE\'S               {morphologize2("here","is");}
LET\'S                {morphologize2("let","us");}
WHERE\'S              {morphologize2("where","is");}
WHO\'S                {morphologize2("who","is");}
WHEN\'S               {morphologize2("when","is");}
IT'S                  {morphologize2("it","is");}
THAT'S                {morphologize2("that","is");}
WHAT'S                {morphologize2("what","is");}
WHO'S                 {morphologize2("who","has");}
WHO'VE                {morphologize2("who","have");}
I'M                   {morphologize2("I","am");}
{word}                {morphologize(yytext,2);}
'[1-9]0S              {morphologize(yytext,2);}
'[1-9][0-9]           {morphologize(yytext,2);}
{word}/'{word}        {morphologize(yytext,2);BEGIN ap;}
<ap>"\'"              {morphologize("*ap",1);}
{l-quote}             {morphologize("*l-quote",1);}
{line}                {morphologize("*line*",1);}
%%
void morphologize2(w1,w2)
  char *w1,*w2;
{
  morphologize(w1,2);
  morphologize(w2,2);
} int found(word1)
     char *word1;
{
  if (lookup_abbrevs_table(word1) != NULL)
    return(1);
  else
    return(0);
}
``` diff_filter.lex

```
%%
\/\/\/67              {printf("\/\/\/00");}
\/\*abbrev\*\/\/78    {printf("\/\/\/00");}
\*ap-s\*              {printf("\*ap\*");}
%%
``` tag20.lex

```
%{
#include "structs.h"
```

```
extern Word     *uulval;
extern char     uuchar;

%}
S               [\ \n\t\(\)]+
L               [0-9][a-z0-9]
T               [A-Za-z0-9\-\.\,]*
F               [A-Z\-a-z]*
ts              \/{T}\/{T}\/{L}
tts             \/{T}\/{L}
pps             {S}{T}\/{T}\/
ppps            {S}{T}\/
ps              {pps}{T}\/
any             {S}[A-Za-z\*\-]+{ts}
capl            {S}\*CAP[A-Z]\*{ts}
capd            {capl}{ps}70
cap             {capl}{ps}[0-9]{2}
junk            {S}\*[A-Za-z]-quote\*{ts}
%%
\<S\>{junk}*{any}       {ECHO;}
{capd}          { ECHO;}
{cap}           { uuchar = '0'; return(90);}
%%
``` tag21.lex

```
%{
#include "structs.h"
extern Word     *uulval;
extern char     uuchar;

%}
S               [\ \n\t\(\)]+
L               [0-9][a-z0-9]
T               [A-Za-z0-9\-\.\,]*
F               [A-Z\-a-z]*
ts              \/{T}\/{T}\/{L}
tts             \/{T}\/{L}
pps             {S}{T}\/{T}\/
ppps            {S}{T}\/
ps              {pps}{T}\/
any             {S}[A-Za-z\*\-]+{ts}
capl            \*CAP[A-Z]\*{ts}
cap             {capl}{ps}[0-9]{2}
junk            \*[A-Za-z]-quote\*{ts}
%%
{capl}[\ ]      ;
{junk}[\ ]      ;
%%
``` tag00.lex

```
%{
#include "structs.h"
extern Word     *uulval;
extern char     uuchar;
%}
S               [\ \n\t\(\)]+
L               [0-9][a-z0-9]
T               [A-Z\*a-z0-9\-\.\,]*
F               [A-Z\-]*
ts              \/{T}\/{T}\/{L}
tts             \/{T}\/{L}
pps             {S}{T}\/{T}\/
ps              {pps}{T}\/
templ           {S}(MONTH|WEEK|YEAR|DECADE|TIME){ts}
month           {S}[A-Z]+\/\*month\*\/\/[0-9]{2}
```

```
day             {S}[A-Z]+\/\*day\*\/\/[0-9]{2}
temp            {month}|{day}
own             {S}OWN{ts}
all             {S}ALL{ts}
possessive      {S}(\*ap\*|ITS|HIS|HER|THEIR|MY|OUR|YOUR){ts}
junk            {S}\*(hyphen|CAPF|d\-quote)\*{ts}
noun            {ps}(10|05|84|07)
may             {S}MAY{ts}
have            {S}HAVE{ts}
aux             {ps}(13|28|16|18|54)
pron            {S}(YOU|WE|THEY){ts}
%%
{possessive}        {uuchar = '7'; return(87);}
\/26                printf("/10");
\/51                printf("/10");
\/46                printf("/08");
{aux}               { uuchar = '9'; return(89);}
{ps}05              { uuchar = '4'; return(84);}
{ps}(06)            { uuchar = '1'; return(91);}
{pps}(RE|PRE)?\/19  { uuchar = '1'; return(81);}
{pps}(RE|PRE)\/10   { uuchar = '1'; return(81);}
{pps}[A-Z\-]*LY\/(27|07|37|40)      { uuchar = '1'; return(91);}
{ps}(27|37|39|40)           { uuchar = '2'; return(92);}
{ps}(22|33|34|52)           { uuchar = '3'; return(83);}
{ps}07/{junk}{noun}     { uuchar = '2'; return(92);}
{S}(MANY|FEW|MOST|SOME|OTHER){ts}{pps}{F}S\/10 { uuchar = '4'; return(84);}
{S}HAVE{ts}{S}ALL{ts}   { uuchar = '1'; return(91);}
{S}(ANOTHER){ts}{ps}(10|08)  { uuchar = '4'; return(84);}
{S}THAT{ts}     { uuchar = '6'; return(86);}
{S}I{ts}        { uuchar = '8'; return(88);}
{S}YOU{ts}      { uuchar = '8'; return(88);}
{S}BEING{ts}    { uuchar = '9'; return(89);}
{pps}\/(60|61)      { uuchar = '1'; return(81);}
{pps}ED\/60         { uuchar = '1'; return(81);}
{pps}ED\/61         { uuchar = '1'; return(81);}
{pps}{F}ING\-S\/[0-9]{2}    { uuchar = '4'; return(84);}
{S}\*dollar\*{ts} { uuchar = '2'; return(92);}
{S}\*pound\*{ts} { uuchar = '2'; return(92);}
{S}\*pc\*{ts} { uuchar = '2'; return(92);}
{ps}03 { uuchar = '2'; return(92);}
{S}(NEXT|LAST){ts}/({temp}|{temp1})     { uuchar = '2'; return(92);}
{temp1}     { uuchar = '4'; BEGIN 0; return(84);}
{temp}      { uuchar = '4'; return(84);}
{pron}{all}         { uuchar = '1'; return(91);}
{may}/{have}            { uuchar = '9'; return(89);}
%%
``` tag10.lex

```
%{
#include "structs.h"
extern Word     *uulval;
extern char     uuchar;
%}
S           [\ \n\t\(\)]+
L           [0-9][a-z0-9]
T           [A-Za-z0-9\-\.\,]*
F           [A-Z\-]*
ts          \/{T}\/{T}\/{L}
tts         \/{T}\/{L}
pps         {S}{T}\/{T}\/
ps          {pps}{T}\/
pron        {ps}09
verb-tag    (19|08|10|26|38|39|46|47|50|51|60|61|62)
verb        {ps}{verb-tag}
adj         ({ps}(07|08|92|83))|({pps}\/26)
ed-verb     {pps}({F}(ED|EN)\/{L})
ed1-verb    {pps}(({F}(ED)\/{L})|{F}(61|62))
_-verb1     {pps}(RE|PRE)?\/{verb-tag}
_-verb      {_-verb1}
Ing-verb    {pps}{F}ING\/{verb-tag}
s-verb      {pps}{F}S\/{verb-tag}
```

```
mod                  {ps}(29|91|83|46|47|48|43|44|38|39|06)|(S)\*D\-
QUOTE\*(ts)|(S)STILL(ts)
t-body               {S}(HE|SHE|IT|SOMEBODY|SOMEONE|NOBODY|NOONE|ANYONE|ONE){ts}
s-body               {S}(THEY|WE|YOU|I){ts}
_-have               {S}HAVE\/{tts}
have-group           {S}((T)\/HAVE{tts}|HAVE{ts})
will-group           {S}(WILL|WOULD|SHALL|SHOULD){ts}
can-group            {S}(CAN|COULD|MUST|MAY|MIGHT|CANNOT){ts}
is-group             {S}(BEING\/|BE\/|(T)\/BE){tts}
do-group             {S}(DO|DID|DOES){ts}
det                  {ps}(17|58|40)|{S}A{ts}
adv                  {ps}91
sf                   {ps}64
more                 {S}(MORE|LESS){ts}
mr                   (GEN|REV|MR|MRS|MS|SEN|REP|DR)[\.]?{ts}|{ps}90)+
possessive           {S}(\*ap\*|ITS|HIS|HER|THEIR|MY|OUR|YOUR){ts}
own                  {S}OWN{ts}
%%
{possessive}{own}              { uuchar = '2'; return(92);}
{pps}{F}S\/19                  { uuchar = '1'; return(81);}
{t-body}{mod}*{s-verb}         { uuchar = '1'; return(81);}
({s-body}|{t-body}){mod}*{ed1-verb}     { uuchar = '1'; return(81);}
{t-body}({_-verb}|{ing-verb})           { printf("%s", yytext);}
{S}TO{ts}({ed-verb})           { uuchar = '2'; return(92);}
{S}TO{ts}({ing-verb})          { ECHO;}
{S}TO{ts}({s-verb})            { uuchar = '4'; return(84);}

{S}TO{ts}{_-verb}              { uuchar = '1'; return(81);}
{have-group}{mod}*({ed-verb}|{ps}(61|62|64|65|66))     { uuchar = '1';
return(81);}
({will-group}|{have-group}|{can-group}|{do-group}){{mod}|({S}STILL{ts})}*{sf}
{ uuchar = '1'; return(81);}
{is-group}({mod}|({S}STILL{ts}))*{ing-verb}       { uuchar = '1'; return(81);}
({is-group})({mod}|({S}(SO|STILL){ts}))*{sf}      { uuchar = '2'; return(82);}
{is-group}({mod}|({S}(STILL|SO){ts}))*{ed-verb}   { uuchar = '2'; return(82);}
{is-group}{ps}(26)             { uuchar = '2'; return(92);}
{have-group}({s-verb}|{ing-verb}|{_-verb}|{ps}(10|26))     { uuchar = '4';
return(84);}
({can-group}|{do-group}|{s-body}|{will-group}){{mod}|({S}STILL{ts})}*({_-
verb})  { uuchar = '1'; return(81);}
({do-group}|{s-body}|{will-group}|{can-group})({_-verb}|{ed-verb}|{ing-
verb})   { ECHO; }
{more}{pps}{F}ED\/[0-9]{2}     { uuchar = '2'; return(92);}
{more}{ps}(19|10)              { uuchar = '4'; return(84);}
{more}{ps}(26|08)              { uuchar = '2'; return(92);}
{mr}({s-verb}|{ed-verb})       { uuchar = '1'; return(81);}
%%
``` tag4.lex

```
%{
#include "structs.h"
extern Word     *uulval;
extern char     uuchar;

%}
%START  hyp
GN              [0-9]{2}
S               [\ \n\t\(\)\}\)\(\]\[]+
L               [0-9][a-z0-9]
T               [A-Za-z0-9\-\.\,]*
F               [A-Z\-]*
ts              \/{T}\/{T}\/{L}
tts             \/{T}\/{L}
ppps            {S}{T}\/
pps             {S}{T}\/{T}\/
ps              {pps}{T}\/
possessive      {S}(\*ap\*|ITS|HIS|HER|THEIR|MY|OUR|YOUR){ts}
```

```
det                  {ps}(15|17|58|40)|{S}A{ts}
number               {S}{ppps}\*num\*{tts}|{ps}37
marker               ({number}|{det})
pron                 {ps}09
verb-tag             (19|08|10|26|38|39|46|47|50|51|60|61|62|63|64|65)
noun-tag             (10|26|64|65)
adj-tag              (08|91|92|83|46|39|85)
verb                 {ps}{verb-tag}
vb_nn                {pps}\/{noun-tag}
noun                 (({ps}{noun-tag})|({pps}ING\/19))
noun1-tag            (05|07|03|10|18|26|51|53)
noun1                {ps}{noun1-tag}
ed-verb              {pps}{F}ED\/{verb-tag}
_-verb               {pps}(RE|PRE)?\/{verb-tag}
Ing-verb             {pps}{F}ING\/{verb-tag}
word                 {S}[A-Z]+{ts}
s-verb               {pps}{F}S\/{verb-tag}
hyphen               {S}\*hyphen\*{ts}
period               {S}\*period\*
adj                  {ps}{adj-tag}
adv                  {ps}(91|83)|{S}STILL{ts}
adj1                 {ed-verb}|{ing-verb}|{ps}08
adj2                 ({ps}(08|06))|({pps}{F}ED\/19)
ap                   {S}\*ap\*{ts}
objective            {S}(HIM|THEM|ME|YOU|US|HER|IT|THEMSELVES){ts}
PP                   {ps}(04|20|23|24|30|31|38|39|47|57|59)|{S}PLUS{ts}
%%
{noun}/{hyphen}           { uuchar = '4'; return(84);}
{adj}/{hyphen}            { uuchar = '2'; return(92);}
{hyphen}{verb}            { uuchar = '2'; BEGIN hyp;return(92);}
{hyphen}{noun}            { uuchar = '4'; BEGIN hyp;return(84);}
{hyphen}{adj}             { uuchar = '2'; BEGIN hyp;return(92);}
{hyphen}{word}            { BEGIN hyp;ECHO;}
<hyp>{noun}               { uuchar = '4'; BEGIN 0; return(84);}
<hyp>{adj2}               { uuchar = '4'; BEGIN 0; return(84);}
<hyp>{ps}{L}              { BEGIN 0; ECHO;}
{vb_nn}/{period}          { uuchar = '4'; return(84);}

({marker}|{possessive})({ing-verb}|{ed-verb})      { uuchar = '2';
return(92);}
({marker}|{possessive}){noun}     { uuchar = '4'; return(84);}
{pron}{ed-verb}           { uuchar = '1'; return(81);}
{ap}{noun1}               { uuchar = '4'; return(84);}
{ap}{adj2}                { uuchar = '2'; return(92);}
{ps}{noun1-tag}/{S}OF{ts}  { uuchar = '4'; return(84);}
{ps}29{ps}(08|46)         { uuchar = '2'; return(92);}
{ps}(29|17){ps}(10|64|65)        { uuchar = '4'; return(84);}
{noun1}/{ap}              { uuchar = '4'; return(84);}
{verb}/{objective}        { uuchar = '1'; return(81);}
%%
``` tag11.lex

```
%{
#include "structs.h"
extern Word    *uulval;
extern char    uuchar;
%}
S              [\ \n\t\(\)]+
L              [0-9][a-z0-9]
T              [A-Za-z0-9\-\.\,]*
F              [A-Z\-]*
ts             \/{T}\/{T}\/{L}
tts            \/{T}\/{L}
pps            {S}{T}\/{T}\/
ppps           {S}{T}\/
ps             {pps}{T}\/
pron           {ps}09
```

```
verb-tag        (19|08|10|26|38|39|46|47|50|51|60|61|62|63|64|65)
verb            {ps}{verb-tag}
ed-verb         {pps}{F}(ED|EN)\/{L}
ing-verb        {pps}{F}(ING)\/{L}
_-verb          {pps}(RE|PRE)?\/{verb-tag}
s-verb          {pps}{F}S\/{verb-tag}
noun-tag        (05|03|10|18|26|51|53|64|65)
noun            {ps}{noun-tag}
adj1            {ed-verb}|{ing-verb}|{ps}08|{ps}62|{pps}{F}\/(60|61)
pp              {ps}(04|20|23|24|30|31|38|39|47|57|59)|{S}PLUS{ts}
conj            {ps}(21|25|32|36|42)
adv             {ps}(91|83)|{S}STILL{ts}
adj             {ps}(29|83|92)
det             {ps}(15|17|58|40)|{S}A{ts}
punc            {S}(\*period\*|\*comma\*|\*d\-quote\*){ts}
number          {S}{ppps}\*num\*{tts}|{ps}37
t-body          {S}(HE|SHE|IT|SOMEBODY|SOMEONE){ts}
s-body          {S}(THEY|WE|YOU|I){ts}
have-group      {S}({T}\/HAVE{tts}|HAVE{ts})
when-group      {S}(BEFORE|AFTER|WHILE|WHEN|IN|ON){ts}
will-group      {S}(WILL|WOULD|SHALL|SHOULD){ts}
can-group       {S}(CAN|COULD|MUST|MAY|MIGHT|CANNOT){ts}
is-group        {S}(BEING\/|BE\/|{T}\/BE){tts}
do-group        {S}(DO|DID|DOES){ts}
ap              {S}\*ap\*{ts}
possessive      {S}(\*ap\*|ITS|HIS|HER|THEIR|MY|OUR|YOUR){ts}
objective       {S}(HIM|THEM|ME|YOU|US|HER|IT|THEMSELVES){ts}
marker          ({number}|{det})
name            {ps}(02|03|00)
adj2            {ps}(08)
mod             {ps}(29|91|83)
pointer         {ps}15
unit            {ppps}\*(dollar|pound|pc)\*{tts}
%%
{S}(THIS|WHO|THERE){ts}{s-verb}                        { uuchar = '1'; return(81);}
{S}(WHO){ts}{_-verb}                                   { uuchar = '1'; return(81);}
{S}(WHO){ts}{ed-verb}                                  { uuchar = '1'; return(81);}
{S}(THESE|THOSE){ts}({ed-verb}|{ing-verb})             { uuchar = '2'; return(92);}
{S}(THESE|THOSE){ts}({s-verb}|{_-verb})                { uuchar = '4'; return(84);}
{S}(WHOSE){ts}{ing-verb}                               { uuchar = '2'; return(92);}
{S}(WHOSE){ts}{ed-verb}                                { uuchar = '2'; return(92);}
{S}(WHOSE){ts}{noun}                                   { uuchar = '4'; return(84);}
({will-group}|{is-group})({S}(STILL|SO){ts})           { uuchar = '1'; return(91);}
{is-group}{mod}*({_-verb}|{s-verb})                    { uuchar = '4'; return(84);}
{is-group}{mod}*{adj}                                  { uuchar = '2'; return(92);}
{marker}{mod}*({ed-verb}|{ing-verb})                   { uuchar = '2'; return(92);}
{marker}{_-verb}                                       { uuchar = '4'; return(84);}
{adv}{ps}07                                            { uuchar = '4'; BEGIN 0;
return(84);}
{ps}07                                                 { uuchar = '2'; return(92);}
{ps}(17|87|58)({ps}08|{ed-verb}|{ing-verb})            { uuchar = '2'; return(92);}
{S}OF{ts}{pps}\/{F}S\/(10|26|64|65|19)                 { uuchar = '4'; return(84);}
%%
``` tag12.lex

```
%{
#include "structs.h"
extern Word     *uulval;
extern char     uuchar;
%}
S               [\ \n\t\(\)]+
L               [0-9][a-z0-9]
T               [A-Za-z0-9\-\:\,\*]*
F               [A-Z\-]*
ts              \/{T}\/{T}\/{L}
tts             \/{T}\/{L}
pps             {S}{T}\/{T}\/
```

```
ps              {pps}{T}\/
pron            {ps}09
verb-tag        (19|08|10|26|38|39|46|47|50|51|60|61|62|63|64|65)
verb            {ps}{verb-tag}
ed-verb         {pps}{F}(ED|EN)\/
_-verb1         {pps}(RE|PRE)?\/{verb-tag}
_-verb          {_-verb1}
Ing-verb        {pps}{F}ING\/
s-verb          {pps}{F}S\/
mod             {ps}(29|06|07)|{S}STILL{ts}
t-body          {S}(HE|SHE|IT){ts}
s-body          {S}(THEY|WE|YOU|I){ts}
have-group      {S}({T}\/HAVE{tts}|HAVE{ts})
will-group      {S}(WILL|WOULD|SHALL|SHOULD){ts}
can-group       {S}(CAN|COULD|MUST|MAY|MIGHT|CANNOT){ts}
is-group        {S}(BEING\/|BE\/|{T}\/BE){tts}
do-group        {S}(DO|DID|DOES){ts}
det             {ps}(17|58|40)|{S}A{ts}
punc            {S}\*(period|dash|and|(r|l)curly|slash|comma|d\-quote|l\-
paren|r\-paren|colon|q-mark|ex-mark|s\-colon|hyphen|ap)\*{ts}
%%
{ps}92{pps}{F}ED\/(19|10)    {ECHO;}
{ps}92{ps}(19|10)      { uuchar = '4'; return(84);}
{ps}91({s-verb}|0|({ing-verb}(10|19))|{_-verb})      { uuchar = '1';
return(81);}
{punc}         { uuchar = '6'; return(86);}
%%
``` tag2.lex

```
%{
#include "structs.h"
extern Word     *uulval;
extern char     uuchar;

%}
S               [\ \n\t\(\)\[\]\{\}]+
L               [0-9][a-z0-9]
T               [A-Za-z0-9\-\.\,]*
F               [A-Z\-]*
ts              \/{T}\/{T}\/{L}
tts             \/{T}\/{L}
pps             {S}{T}\/{T}\/
ppps            {S}{T}\/
ps              {pps}{T}\/
pron            {ps}09
verb10          {ps}\/10
verb-tag        (19|08|10|26|38|39|46|47|50|51)
verb            {ps}{verb-tag}
ed-verb         {pps}{F}ED\/{verb-tag}
_-verb          {pps}(RE|PRE)?\/{verb-tag}
Ing-verb        {pps}{F}ING\/{verb-tag}
s-verb          {pps}{F}S\/{verb-tag}
noun-tag        (05|07|03|10|18|26|51|53)
noun            {ps}{noun-tag}
adj             {ed-verb}|{ps}(08|83)
pp              {ps}(04|20|23|24|30|31|38|39|47|57|59)|{S}PLUS{ts}
conj            {ps}(21|25|32|36|42)
mod             {ps}(29|06)|{S}STILL{ts}
det             {ps}(17|40|58)
punc            {S}(\*period\*|\*comma\*){ts}
t-body          {S}(HE|SHE|IT){ts}
s-body          {S}(THEY|WE|YOU|I){ts}
have-group      {S}({T}\/HAVE{tts}|HAVE{ts})
when-group      {S}(BEFORE|AFTER|WHILE|WHEN|IN|ON){ts}
will-group      {S}(WILL|WOULD|SHALL|SHOULD){ts}
can-group       {S}(CAN|COULD|MUST|MAY|MIGHT){ts}
is-group        {S}((BEING{ts})(BE{ts})|({T}\/BE{tts}))
```

```
do-group         {S}(DO|DID|DOES){ts}
aux-group        (((is-group)|(have-group)|(can-group)|(will-group)|(do-
group)))
ap               {S}\*ap\*{ts}
possessive       {S}(\*ap\*|ITS|HIS|HER|THEIR|MY|OUR|YOUR){ts}
number           {ppps}\*num\*{tts}
unit             {S}\*(dollar|pound|pc)\*{ts}
marker           (((number)|(pp)|(det))
name             (ps)(02|03|00)
much             (ps)(48|17|29)
v-mod            (ps)8a
pointer          (ps)15
qnt              (ps)(44|29)
of               {S}OF{ts}
%%
(((s-verb)|(ed-verb)|(ing-verb))/(v-
mod)?((number)|(unit)|(det)|(possessive)|(pointer)|(pron)|(qnt))      {
uuchar = '1'; return(81);}
(verb10)/((det)|(possessive))        { uuchar = '1'; return(81);}
(ps)83(noun)        { uuchar = '4'; return(84);}
(pps)(F)ING\/19/(aux-group)         { uuchar = '4'; return(84);}
(ps)83(adj)         { uuchar = '3'; return(92);}
(ps)15(ps)(10|26)         { uuchar = '4'; return(84);}
{S}THOSE{ts}(ing-verb)   { uuchar = '1'; return(81);}
{S}THOSE{ts}(ed-verb)    { uuchar = '2'; return(82);}
(noun)/(v-mod)?(aux-group)   { uuchar = '4'; return(84);}
(pps)(F)ED\/19/(of)       { uuchar = '2'; return(82);}
(pps)(F)ING\/19/(of)      { uuchar = '4'; return(84);}
%%
``` bra23.lex

```
S            [\ \t]+
L            [0-9][a-z0-9]
T            [A-Za-z0-9\-\.\,\*]*
F            [A-Z\-]*
ts           \/{T}\/{T}\/{L}
tts          \/{T}\/{L}
ppps         {S}{T}\/
pps          {S}{T}\/{T}\/
ps           {pps}{T}\/
pp           (ps)(04|20|23|24|30|31|38|39|47|57|59)
pron         (ps)09
possessive   {S}(ITS|HIS|HER|THEIR|OUR|MY|YOUR){ts}
det          (ps)(17|58|40|44|29|07|35|87)|{S}A{ts}
number       {ppps}\*num\*{tts}|(ps)(35|37)
day          {ppps}\*day\*{tts}
month        {ppps}\*month\*{tts}
more-group   (ps)(17|29|48)
than         {S}THAN{ts}
name         (ps)(80|00|90)
mod          (ps)06
hyphen       {S}\*hyphen\*{ts}
word         {S}[A-Z]+{ts}
hwh          (hyphen)(word)(hyphen)
nn      (ps)(84|07)
v-mod   (ps)8a
ad      ((ps)91)?((ps)(92|83))+
ng0     (ad)?((nn)(v-mod)?|(name))+
ng00    (ad)
ng1     ((possessive)|(det)+|(ps)15)((ng0)|(ng00))
ng2     (ps)15
ng4     ((det)+|(more-group))+
objective   {S}(ME|YOU|HIM|HER|US|THEM|OURSELF|OURSELVES|MYSELF|
            YOURSELF|HIMSELF|HERSELF){ts}
```

```
%%
{possessive}    {printf("%s", yytext);}
{pron}          |
{ng1}           |
{ng2}           |
{ng4}           |
{ng00}          |
{ng0}           {printf(" \(%s\) ", yytext);}
{pp}{objective} {printf(" \(%s\) ", yytext);}
%%
``` bra22.lex

```
S               [\ \n\t]+
L               [0-9]|[a-z0-9]
T               [A-Za-z0-9\-\:\,\*]*
F               [A-Z\-]*
ts              \/{T}\/{T}\/{L}
tts             \/{T}\/{L}
ppps            {S}{T}\/
pps             {S}{T}\/{T}\/
ps              {pps}{T}\/
pp              {ps}(04|20|23|24|30|31|38|39|47|57|59|85)
pron            {S}(IT|SHE|HE|I|YOU|WE|US|THEY|ME|HIM|HER|THEM|
                    HIMSELF|YOURSELF|MYSELF|THEMSELVES){ts}
possessive      {S}(ITS|HIS|HER|THEIR|OUR|MY|YOUR){ts}
det             {ps}(17|58|40|44|29|87)|{S}A{ts}
number          {ppps}\*num\*{tts}|{ps}(35|37)
day             {ppps}\*day\*{tts}
month           {ppps}\*month\*{tts}
more-group      {ps}(17|29|48)
than            {S}THAN{ts}
name            {ps}(80|90)
mod             {ps}06
nn              {ps}84
units           {ppps}\*(dollar|pc|pound)\*{tts}
v-mod           {ps}8a
ad              ({ps}91)?{ps}(92|83)
ng0             (({ad}|{number}|{units}|{nn}{v-mod}?|{name})+
ng1             ({possessive}|{det}|{ps}15){ng0}|{ps}00|{pron}
ng2             {ps}15
ng4             (({det}|{more-group})+
n-mod           {ps}8b
br              [\(][^)]+[\)]
ng6             {n-mod}?{pp}{S}{br}
%%
{pron}  {printf(" \[%s\] ", yytext);}
{ng6}   {printf(" \[%s\] ", yytext);}
[\(]    printf("[");
[\)]    printf("]");
%%
``` bra24.lex

```
%%
\(  ;
\)  ;
%%
``` bra2.lex

```
S     [\ \n\t]+
BRA   [\]\[]
L     [0-9]|[a-z0-9]
T     [A-Za-z0-9\-\.\,]*
F     [A-Z\-]*
```

```
ts        \/{T}\/{T}\/{L}
tts       \/{T}\/{L}
pps       {S}{T}\/{T}\/
ps        {pps}{T}\/
ps1       {T}\/{T}\/{T}\/
pp        {ps}(04|20|23|24|30|31|38|47|57)
pron      {S}(IT|SHE|HE|I|YOU|US|WE|THEY|ME|HIM|HER|THEM|HIMSELF|YOURSELF|
          MYSELF|THEMSELVES){ts}
possessive {S}(ITS|HIS|HER|THEIR|OUR|MY|YOUR){ts}
det       {ps}(17|58|40|87)|{S}A{ts}
punc      {S}(\*period\*|\*comma\*){ts}
number    {ps}(35|37)
verb      {ps}(81|82)
adj       {ps}(92|83)
be        {S}((BEING{ts})|(BE{ts})|({T}\/BE{tts}))
have      {S}({T}\/HAVE{tts}|HAVE{ts})
do        {S}(DO|DID|DOES){ts}
will      {S}(WILL|WOULD|SHALL|SHOULD){ts}
can       {S}(CAN|COULD|MUST|MAY|MIGHT){ts}
snumber   {S}(\*SNUMBER\*){ts}
more-group {ps}(17|29|48)
too       {S}TOO{ts}
to        {S}TO{ts}
than      {S}(OF){ts}
name      {ps}(03|00|02)
mod       {ps}(83|91)|{S}\*D\-QUOTE\*{ts}|{S}(ONLY|JUST|STILL){ts}
money     {S}\${ts}{number}
pc        {S}\*PC\*{ts}
ing-verb  {pps}{F}ING\/(19|81)
nn        {ps}84|{S}(\*year\*|\*month\*|\*day\*|C){ts}
v-mod     {ps}8a
noun-group \[
vg1       {verb}{v-mod}?
vg2       (({to}|{do}|{will}|{can}|{mod}|{have}|{be})+{verb}{v-mod}?
vg3       (({to}|{will}|{can}|{mod}|{have}|{be})+
vg4       {pp}{ing-verb}
vg5       (({to}|{do}|{will}|{can}|{mod}|{have})+{be}{adj}{v-mod}?
%%
{vg1}             |
{vg2}             |
{vg4}             |
{vg5}             |
{vg3}/{S}{noun-group}    {printf(" \[%s\] ", yytext);}
%%
``` tag3.lex

```
%{
#include "structs.h"
extern Word    *uulval;
extern char    uuchar;

%}
S          [\ \n\t\[\(\)\]]+
L          [0-9][a-z0-9]
T          [A-Za-z0-9\-\.\,]*
T1         [A-Za-z0-9\-\.\,]+
F          [A-Z\-]*
ts         \/{T}\/{T}\/{L}
tts        \/{T}\/{L}
pps        {S}{T}\/{T}\/
ps         {pps}{T}\/
date       {S}{T1}\/\*(year|month|day)\*{tts}
possessive {S}(\*ap\*|ITS|HIS|HER|THEIR|MY|OUR|YOUR){ts}
number     {S}{ps}\*num\*{tts}
punc       {S}(\*period\*|\*comma\*|\*d\-quote\*){ts}
ap         {S}\*ap\*{ts}
```

```
pron            {ps}09
name            {ps}(02|03)
uname           {ps}00
aux             {ps}(13|28|16|18|54)
pp              {ps}(04|20|23|24|30|31|38|47|57|59|8a|8b)|{S}PLUS{ts}
conj            {ps}(21|25|32|36|42|11|32)|{punc}|{ap}
mod             {ps}(35|37|06)|{number}|{S}\${ts}
det             {possessive}|{ps}(15|17|58|40)
date1           ({ps}01)|{date}
mod1            {ps}(83|91|92)
marker          ({number}|{det})
%%
{name}          { uuchar = '0'; return(90);}
{uname}         { uuchar = '0'; return(80);}
{pp}            { uuchar = '5'; return(85);}
{pron}          { uuchar = '8'; return(88);}
{conj}          { uuchar = '6'; return(86);}
{det}           { uuchar = '7'; return(87);}
{mod}           { uuchar = '3'; return(83);}
{aux}           { uuchar = '9'; return(89);}
{date1}         { uuchar = '4'; return(84);}
{number}        { uuchar = '4'; return(84);}
%%
``` bra4.lex

```
S               [\ \n\t\(\)]+
L               [0-9][a-z0-9]
T               [A-Za-z0-9\-\.\,]*
F               [A-Z\-]*
ts              \/{T}\/{T}\/{L}
tts             \/{T}\/{L}
pps             {S}{T}\/{T}\/
ps              {pps}{T}\/
hyphen          \*hyphen\*{ts}
ap              \*ap\*{ts}
slash           \*slash\*{ts}
and             \*and\*{ts}
name            {ps}(80|90)
%%
{name}+   printf(" {{%s}}", yytext+1);
[\)]{S}({hyphen}|{and}){S}[\(]   printf(" %s ", "*hyphen*///86");
[\)]{S}({ap}|{and}){S}[\(]       printf(" %s ", "*ap*///86");
[\)]{S}({slash}|{and}){S}[\(]    printf(" %s ", "*slash*///86");
%%
``` bra25.lex

```
S               [\ \n\t]+
L               [0-9][a-z0-9]
T               [A-Za-z0-9\-\.\,\*]*
F               [A-Z\-]*
ts              \/{T}\/{T}\/{L}
tts             \/{T}\/{L}
ppps            {S}{T}\/
pps             {S}{T}\/{T}\/
ps              {pps}{T}\/
pp              {ps}(04|20|23|24|30|31|38|39|47|57|59|85)
pron            {S}(IT|SHE|HE|I|YOU|WE|US|THEY|ME|HIM|HER|THEM|HIMSELF|
                    YOURSELF|MYSELF|THEMSELVES){ts}
possessive      {S}(ITS|HIS|HER|THEIR|OUR|MY|YOUR){ts}
det             {ps}(17|58|40|44|29)|{S}A{ts}
number          {ppps}\*num\*{tts}|{ps}(35|37)
day             {ppps}\*day\*{tts}
month           {ppps}\*month\*{tts}
more-group      {ps}(17|29|48)
than            {S}THAN{ts}
S1              [\ \t\(\)]+
```

```
%%
"</REQ-NO>\ "   {printf("%s\n", yytext);}
"</HL>\ "       {printf("%s\n", yytext);}
\[{S} printf("[");
\[(\ )*(\n)+ printf("%s[", yytext+1);
%%
``` tag31.lex

```
%START sgerund sless
%{
#include "structs.h"
extern Word     *uulval;
extern char     uuchar;
%}
S               [\ \n\t\(\)\]\[]+
L               [0-9][a-z0-9]
T               [A-Za-z0-9\-\.\,]*
F               [A-Z\-]*
ts              \/{T}\/{T}\/{L}
tts             \/{T}\/{L}
pps             {S}{T}\/{T}\/
ps              {pps}{T}\/
pron            {ps}09
verb-tag        (19|08|10|26|38|39|46|47|50|51)
verb            {ps}{verb-tag}
adj             ({ps}(07|08|92|83))|({pps}\/26)
ed-verb         {pps}{F}(ED|EN)\/{verb-tag}
_-verb1         {pps}(RE|PRE)?\/{verb-tag}
_-verb2         {S}(BECOME|COME|RUN|HIT|BID)\/\/{T}\/{verb-tag}
_-verb          {_-verb1}|{_-verb2}
ing-verb        {pps}{F}ING\/{verb-tag}
s-verb          {pps}{F}S\/{verb-tag}
mod             {ps}(29|91|83)|{S}\*D\-QUOTE\*{ts}|{S}STILL{ts}
t-body          {S}(HE|SHE|IT){ts}
s-body          {S}(THEY|WE|YOU|I){ts}
_-have          {S}HAVE\/{tts}
have-group      {S}({T}\/HAVE{tts}|HAVE{ts})
will-group      {S}(WILL|WOULD|SHALL|SHOULD){ts}
can-group       {S}(CAN|COULD|MUST|MAY|MIGHT|CANNOT){ts}
is-group        {S}(BEING\/|BE\/|{T}\/BE){tts}
do-group        {S}(DO|DID|DOES){ts}
adv             {ps}91
number          {S}{ps}\*num\*{tts}
GERUND          (DENY|TRY|STOP|CONTINUE|START|QUIT|HALT|KEEP|GET|BEGIN|
                    AVOID|RECOMMEND|PROPOSE|RISK|RESTRICT|CONSIDER|COMPLETE|
                    CEASE|GO)
LESS            LET|HELP|GO
possessive      {S}(\*ap\*|ITS|HIS|HER|THEIR|MY|OUR|YOUR){ts}
NP              \[([A-Z0-9\/\(\-\ \n\.\)a-z\*])+\]
NP1              ([A-Z0-9\/\(\-\ \n\.\)a-z\*])+\]
det             {possessive}|{ps}(15|17|58|40|87)
date1            {ps}01|{date}
mod1            {ps}(83|91|92)
marker          ({number}|{det})
noun            {ps}(05|07|03|10|18|26|51|53)
token           {S}[A-Z]+{ts}
%%
{S}((({GERUND})\/{T})|({T}\/{GERUND}))\/{T}\/(10|81|82|19)/
    {pps}{F}ING\/(08|19|10|26)
            { BEGIN sgerund;uuchar = '1'; return(81);}
<sgerund>{pps}{F}ING\/(08|19|10|26)
            { BEGIN 0;uuchar = '1'; return(81);}
<sgerund>{token}    { BEGIN 0; REJECT;}
{S}((({LESS})\/{T})|({T}\/{LESS}))\/{T}\/(81|82|19)/
    {pps}\/(10|26|62|63|64)
            { BEGIN sless;uuchar = '1'; return(81);}
```

```
<sless>{pps}\/(10|26|62|63|64)
        { BEGIN 0;uuchar = '1'; return(81);}
<sless>{token}    { BEGIN 0; REJECT;}
{S}(((GET\/{T})|({T}\/GET))\/{T}\/(81|82|19|10)/
    {pps}{EN|ED}\/(08|26|62|63|64|19)
        { BEGIN sget;uuchar = '2'; return(81);}
<sget>{pps}{EN|ED}\/(08|26|62|63|64|19)
        { BEGIN sget;uuchar = '2'; return(82);}
<sget>{token}    { BEGIN 0; REJECT;}
{S}(((HELP|LET)\/{T})|({T}\/(HELP|LET)))\/
    {T}\/(10|81|82|19){\ \n\]]+{NP}{pps}\/(10|26|62|63|64)
        { uuchar = '1'; return(81);}
{S}(((GET\/{T})|({T}\/GET))\/{T}\/(81|82|19){\ \n\]]+{NP}
    {pps}{ED|EN}\/(08|26|62|63|64|19)
        { uuchar = '2'; return(82);}
{ps}91{pps}{ED|ING}\/{ts}/{noun}   { uuchar = '2'; return(92);}
{pps}ED\/(08|19)/{S}THAT         { uuchar = '1'; return(81);}
{ps}84{S}THAT{ts}{pps}{F}S/\10      { uuchar = '1'; return(81);}
{ps}85{S}{WHICH}{ts}   {ECHO;}
{S}{WHICH}{ts}{pps}({F}S\/10|\/10)   { uuchar = '1'; return(81);}
{S}{IF|THAN|OF}{ts}{pps}({F}S\/10|\/10) { uuchar = '4'; return(84);}
{S}{IF|THAN|OF}{ts}{pps}({F}ED\/(08|19)) { uuchar = '2'; return(92);}
{S}EVEN\/\/\/08    { uuchar = '6'; return(86);}
{pps}\/10/{det}           { uuchar = '1'; return(81);}
85{pps}S\/10              { uuchar = '4'; return(84);}
85{pps}\/10               { uuchar = '4'; return(84);}
%%
``` rmbrackets.lex

```
strictlytext    [A-Z]+
%%
\[{strictlytext}\] ECHO;
[\[\]\{\}]  ;
%%
``` tag45.lex

```
%{
#include "structs.h"
extern Word    *uulval;
extern char    uuchar;
%}
T      [A-Z\.\*\-]*
L      [A-Z\.\*0-9]+
N      [0-9]{2}
S      [\ \t\n\]\[\{\}]+
ts     \/{T}\/{T}\/{N}
ps     {S}{L}\/{T}\/{T}\/
qq     {S}(WHAT|WHO|WHY|WHERE|WHICH|WHOM|WHOSE|WHEN){ts}
period  {S}\*period\*{ts}
aux    {ps}89
pn     {ps}88
%%
{period}{qq}    { uuchar = '6'; return(96);}
{period}{aux}   { uuchar = '6'; return(96);}
{qq}{aux}     { uuchar = '6'; return(96);}
{aux}{pn}     { uuchar = '6'; return(96);}
%%
``` phrase_tagger phrase_tagger.lex

```
%{
int nn_flag,vb_flag,md_flag,pp_flag;
%}
S              [\ \n\t\(\)\]\[\{\}]+
L              [0-9][a-z0-9]
T              [A-Za-z0-9\-\.\,\*]*
F              [A-Z\-]*
```

```
ts              \/{T}\/{T}\/{L}
tts             \/{T}\/{L}
pps             {S}{T}\/{T}\/
ps              {pps}{T}\/
pron            {ps}09
verb-tag        (19|08|10|26|38|39|46|47|50|51|60|61|62)
verb            {ps}{verb-tag}
adj             ({ps}(07|08|92|83))|({pps}\/26)
ed-verb         {pps}({F}(ED|EN)\/{L})
ed1-verb        {pps}(({F}(ED)\/{L})|{F}(61|62))
_-verb1         {pps}(RE|PRE)?\/{verb-tag}
_-verb          {_-verb1}
ing-verb        {pps}{F}ING\/{verb-tag}
s-verb          {pps}{F}S\/{verb-tag}
mod             {ps}(29|91|83|46|47|48|43|44|38|39)|{S}\*D\-
QUOTE\*{ts}|{S}STILL{ts}
t-body          {S}(HE|SHE|IT|SOMEBODY|SOMEONE|NOBODY|NOONE|ANYONE|ONE){ts}
s-body          {S}(THEY|WE|YOU|I){ts}
_-have          {S}HAVE\/{tts}
have-group      {S}(({T}\/HAVE{ts}|HAVE{ts})
will-group      {S}(WILL|WOULD|SHALL|SHOULD){ts}
can-group       {S}(CAN|COULD|MUST|MAY|MIGHT|CANNOT){ts}
is-group        {S}(BEING\/|BE\/|{T}\/BE){tts}
do-group        {S}(DO|DID|DOES){ts}
det             {ps}(17|58|40)|{S}A{ts}
adv             {ps}91
sf              {ps}64
more            {S}(MORE|LESS|AS){ts}
mr              (GEN|REV|MR|MRS|MS|SEN|REP|DR)[\.]?{ts}({ps}90)+
pp              {ps}85
nn              {ps}(80|90|84|88|87|00|44|29)
vb              {ps}(81|82|89)
md              {ps}(83|92|91)
%%
\[{S}?{pp}          { pp_flag = 1;ECHO;}
{nn}{S}?\]          {ECHO;if (pp_flag == 1) printf("///97"); else
printf("///98"); pp_flag = 0; }
{vb}{S}?\]          {ECHO;printf("///99"); pp_flag = 0; }
{md}{S}?\]          {ECHO;if (pp_flag == 1) printf("///97"); else
printf("///96"); pp_flag = 0; }
%% rmbraces.lex

%%
\(\{                ;
\)\}                ;
%% fix_brackets.lex

%%
\[(\ )*(\n)+        printf("%s[",yytext+1);
%%

{adj}/{hyphen}                  { uuchar = '2'; return(92);}
{hyphen}{verb}                  { uuchar = '2'; BEGIN hyp;return(92);}
{hyphen}{noun}                  { uuchar = '4'; BEGIN hyp;return(84);}
{hyphen}{adj}                   { uuchar = '2'; BEGIN hyp;return(92);}
{hyphen}{word}                  { BEGIN hyp;ECHO;}
<hyp>{noun}                     { uuchar = '4'; BEGIN 0; return(84);}
<hyp>{adj2}                     { uuchar = '4'; BEGIN 0; return(84);}
<hyp>{ps}{L}                    { BEGIN 0; ECHO;}
{vb_nn}/{period}                { uuchar = '4'; return(84);}

(({marker}|{possessive})({ing-verb}|{ed-verb}))     { uuchar = '2';
return(92);}
(({marker}|{possessive}){noun}      { uuchar = '4'; return(84);}
{pron}{ed-verb}         { uuchar = '1'; return(81);}
{ap}{noun1}             { uuchar = '4'; return(84);}
{ap}{adj2}              { uuchar = '2'; return(92);}
```

```
{ps}{noun1=tag}/{S}OF{ts}     ( uuchar = '4'; return(84);)
{ps}29{ps}{08|46}             ( uuchar = '2'; return(92);)
{ps}(29|17){ps}(10|64|65)        ( uuchar = '4'; return(84);)
{noun1}/{ap}                  ( uuchar = '4'; return(84);)
{verb}/{objective}            ( uuchar = '1'; return(81);)
%%
``` tag45.lex

```
%{
#include "structs.h"
extern Word    *uulval;
extern char    uuchar;
%}
T       [A-Z\.\*\-]*
L       [A-Z\.\*0-9]+
N       [0-9]{2}
S       [\ \t\n\]\(\)\{]+
ts      \/{T}\/{T}\/{N}
ps      {S}{L}\/{T}\/{T}\/
qq      {S}(WHAT|WHO|WHY|WHERE|WHICH|WHOM|WHOSE|WHEN){ts}
period  {S}\*period\*{ts}
aux     {ps}89
pn      {ps}83
%%
{period}{qq}     ( uuchar = '6'; return(96);)
{period}{aux}    ( uuchar = '6'; return(96);)
{qq}{aux}        ( uuchar = '6'; return(96);)
{aux}{pn}        ( uuchar = '6'; return(96);)
%%
```

What is claimed is:

1. A method for constructing an enhanced text corpus file using a computer and comprising the steps of:
providing a text corpus file to said computer, said text corpus file comprising respective electrical signals representative of a predetermined natural language data;
processing said electrical signals to parse said text corpus file into a plurality of sentences each constituted of a respective stream of corpus words;
executing linguistic analysis upon each said stream of corpus words to derive respective part-of-speech information and morphological roots corresponding to respective ones of said corpus words; and
generating an enhanced text corpus file using said derived morphological roots and said derived part-of-speech information.

2. A method in accordance with claim 1 wherein the step of executing said linguistic analysis comprises:
executing morphological analysis upon each said stream of corpus words to derive said morphological roots; and
executing syntactic analysis upon each said stream of corpus words to derive said part-of-speech information.

3. A method in accordance with claim 2 wherein the step of executing said syntactic analysis further includes tagging said part-of-speech information with respective ones of said corpus words.

4. A method in accordance with claim 3 wherein the step of executing said linguistic analysis further includes executing lexical analysis to acquire predetermined lexical entries corresponding to respective ones of said corpus words.

5. A method in accordance with claim 4 wherein the step of executing said linguistic analysis further includes executing semantic analysis upon each said stream of corpus words to generate lexical variations corresponding to respective ones of said corpus words.

6. A method in accordance with claim 5 wherein said enhanced text corpus file comprises a plurality of enhanced sentences each constituted of a respective stream of enhanced words.

7. A method in accordance with claim 6 wherein each of said enhanced words includes at least the derived morphological root and the part-of-speech information corresponding to said enhanced word.

8. A method in accordance with claim 7 wherein each of said enhanced words further includes a corresponding affix.

9. A method in accordance with claim 8 wherein said corresponding affix comprises a prefix and a suffix.

10. A method for constructing trigger token morphemes using a computer and comprising the steps of:
providing a query text file to said computer, said query text file comprising respective electrical signals representative of predetermined inquiry data;
processing the electrical signals representative of said predetermined inquiry data to parse said query text file into respective query items each constituted of a respective stream of query words;
executing morphological analysis upon each said stream of query words to derive respective morphological roots corresponding to respective ones of said query words;
executing semantic analysis upon each said stream of query words to generate respective lexical variants corresponding to respective ones of said query words, and
generating a plurality of trigger token morphemes corresponding to respective ones of said query items, said plurality of trigger token morphemes using said derived morphological roots and said derived lexical variants corresponding to respective ones of said query words.

11. A method according to claim 10 wherein the step of providing said query text file further comprises providing part-of-speech and collocation information associated with respective ones of said query words.

12. A method according to claim 11 further comprising the step of executing domain specific synonym analysis upon each said stream of query words to derive predetermined synonyms corresponding to respective ones of said query words.

13. A method for retrieving selected portions from an enhanced text corpus file using a computer and comprising the steps of:
generating a search mask stream based upon a plurality of predetermined trigger token morphemes;
scanning said enhanced text corpus file; and
correlating said search mask stream with respect to said enhanced text corpus file for retrieving a selected portion of said enhanced text corpus file based upon a match between said search mask stream and said enhanced text corpus file.

14. An enhancement and retrieval method for natural language data using a computer and comprising the steps of:
providing a text corpus file to said computer, said text corpus file comprising respective electrical signals representative of said natural language data;
processing said electrical signals to parse said text corpus file into a plurality of sentences each constituted of a respective stream of corpus words;
executing linguistic analysis upon each said stream of corpus words to derive respective part-of-speech information and morphological roots corresponding to respective ones of said corpus words; and
generating an enhanced text corpus file using said derived morphological roots and said derived part-of-speech information.

15. A method in accordance with claim 14 wherein the step of executing said linguistic analysis comprises:
executing morphological analysis upon each said stream of corpus words to derive said morphological roots; and
executing syntactic analysis upon each said stream of corpus words to derive said part-of-speech information.

16. A method in accordance with claim 15 wherein the step of executing said syntactic analysis further includes tagging said part-of-speech information with respective ones of said corpus words.

17. A method in accordance with claim 16 wherein the step of executing said linguistic analysis further includes executing lexical analysis to acquire predetermined lexical entries corresponding to respective ones of said corpus words.

18. A method in accordance with claim 17 wherein the step of executing said linguistic analysis further includes executing semantic analysis upon each said stream of corpus words to generate lexical variations corresponding to respective ones of said corpus words.

19. A method in accordance with claim 18 wherein said enhanced text corpus file comprises a plurality of enhanced sentences each constituted of a respective stream of enhanced words.

20. A method in accordance with claim 19 wherein each of said enhanced words includes at least the derived morphological root and the part-of-speech information corresponding to said enhanced word.

21. A method in accordance with claim 20 wherein each of said enhanced words further includes a corresponding affix.

22. A method in accordance with claim 21 wherein said corresponding affix comprises a prefix and a suffix.

23. A method in accordance with claim 22 and further comprising the steps of:
providing a query text file to said computer, said query text file comprising respective electrical signals representative of predetermined inquiry data;
processing the electrical signals representative of said predetermined inquiry data to parse said query text file into respective query items each constituted of a respective stream of query words;
executing morphological analysis upon each said stream of query words to derive respective morphological roots corresponding to respective ones of said query words;
executing semantic analysis upon each said stream of query words to generate respective lexical variants corresponding to respective ones of said query words, and
generating a plurality of trigger token morphemes corresponding to respective ones of said query items, said plurality of trigger token morphemes using said derived morphological roots and said derived lexical variants corresponding to respective ones of said query words.

24. A method according to claim 23 wherein the step of providing said query text file further comprises providing part-of-speech and collocation information associated with respective ones of said query words.

25. A method according to claim 24 further comprising the step of executing domain specific synonym analysis upon each said stream of query words to derive predetermined synonyms corresponding to respective ones of said query words.

26. A method according to claim 25 further comprising the steps of:
generating a search mask stream based upon said plurality of trigger token morphemes;
scanning said enhanced text corpus file; and
correlating said search mask stream with respect to said enhanced text corpus file for retrieving a selected portion of said enhanced text corpus file based upon a match between said search mask stream and said enhanced text corpus file.

* * * * *